US010778348B2

(12) United States Patent
Gao et al.

(10) Patent No.: US 10,778,348 B2
(45) Date of Patent: Sep. 15, 2020

(54) INTERFERENCE MEASUREMENTS AND CHANNEL STATE INFORMATION FEEDBACK FOR MULTI-USER MULTIPLE-IN MULTIPLE-OUT

(71) Applicant: Telefonaktiebolaget LM Ericsson (publ), Stockholm (SE)

(72) Inventors: Shiwei Gao, Nepean (CA); Sebastian Faxér, Järfälla (SE); Mattias Frenne, Uppsala (SE); Stephen Grant, Pleasanton, CA (US); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/176,948

(22) Filed: Oct. 31, 2018

(65) Prior Publication Data
US 2019/0068303 A1 Feb. 28, 2019

Related U.S. Application Data

(63) Continuation of application No. PCT/IB2018/053133, filed on May 4, 2018.
(Continued)

(51) Int. Cl.
*H04B 17/318* (2015.01)
*H04L 5/00* (2006.01)
(Continued)

(52) U.S. Cl.
CPC ........ *H04B 17/318* (2015.01); *H04B 7/0452* (2013.01); *H04B 7/0626* (2013.01);
(Continued)

(58) Field of Classification Search
CPC .. H04B 7/0626; H04B 17/318; H04B 17/345; H04J 11/005
See application file for complete search history.

(56) References Cited

U.S. PATENT DOCUMENTS

| 2013/0301450 A1* | 11/2013 | Geirhofer | ............. | H04B 7/024 |
| | | | | 370/252 |
| 2015/0131563 A1* | 5/2015 | Guo | ..................... | H04B 7/0626 |
| | | | | 370/329 |

(Continued)

FOREIGN PATENT DOCUMENTS

WO 2017/050299 A1 3/2017

OTHER PUBLICATIONS

International Search Report and Written Opinion of the International Searching Authority dated Jul. 19, 2018 issued in corresponding PCT Application Serial No. PCT/IB2018/053133, consisting of 14 pages.
(Continued)

*Primary Examiner* — David B Lugo
(74) *Attorney, Agent, or Firm* — Christopher & Weisberg, P.A.

(57) ABSTRACT

Methods and apparatuses for channel state information (CSI) feedback in a wireless network. In one embodiment, a method includes receiving signaling including a first Non-Zero Power (NZP) CSI-reference signal (RS) configuration for channel measurement; a second NZP CSI-RS configuration; and a CSI interference measurement (CSI-IM) configuration for interference measurement. The method includes receiving a CSI feedback request and estimating the CSI based on at least the signaled first NZP CSI-RS configuration, the second NZP CSI-RS configuration, and the CSI-IM configuration.

21 Claims, 16 Drawing Sheets

Related U.S. Application Data

(60) Provisional application No. 62/502,454, filed on May 5, 2017.

(51) Int. Cl.

| | | |
|---|---|---|
| *H04L 25/02* | (2006.01) | |
| *H04B 7/06* | (2006.01) | |
| *H04B 7/0452* | (2017.01) | |
| *H04B 17/345* | (2015.01) | |
| *H04J 11/00* | (2006.01) | |

(52) U.S. Cl.
CPC ......... *H04B 7/0632* (2013.01); *H04B 7/0697* (2013.01); *H04B 17/345* (2015.01); *H04J 11/005* (2013.01); *H04L 5/005* (2013.01); *H04L 5/0023* (2013.01); *H04L 5/0057* (2013.01); *H04L 25/0206* (2013.01); *H04L 25/0224* (2013.01); *H04L 5/0053* (2013.01); *H04L 5/0092* (2013.01)

(56) References Cited

U.S. PATENT DOCUMENTS

| | | |
|---|---|---|
| 2017/0006492 A1 | 1/2017 | Khoshnevisan et al. |
| 2017/0063503 A1 | 3/2017 | Liu et al. |
| 2018/0212663 A1 | 7/2018 | Liu et al. |

OTHER PUBLICATIONS

3GPP TR 36.741 V2.0.1 (Feb. 2017) 3rd Generation Partnership Project; Technical Specification Group Radio Access Network; Study on Further Enhancements to Coordinated Multi-Point (CoMP) Operation for LTE (Release 14), consisting of 26 pages.

3GPP TSG RAN WG1 Meeting #86bis, R1-1609291; Lisbon, Portugal Oct. 10-14, 2016; Source: CMCC, Enhancing Interference Measurement for MU Transmission; Agenda Item: 7.2.2.1.2; Document for Discussion and Decision, consisting of 4 pages.

3GPP TSG RAN WG1 Meeting #89, R1-1707968; Hangzhou, P.R. China May 15-19, 2017; Source: Samsung, Discussions on Channel and Interference Measurements for NR; Agenda Item: 7.1.2.3.6; Document for Discussion and Decision, consisting of 8 pages.

3GPP TSG RAN WG1 Meeting #86bis, R1-1608598; Lisbon, Portugal Oct. 10-14, 2016; Source: Huawei, HiSilicon, Interference Measurement Enhancement in LTE Rel-14; Agenda Item: 7.2.2.1.2; Document for Discussion and Decision, consisting of 6 pages.

3GPP TSG RAN WG1 Meeting #86bis, R1-1609015; Lisbon, Portugal Oct. 10-14, 2016; Source: Samsung, Discussions on Enhanced Interference Measurement Based on NZP CSI-RS; Agenda Item: 7.2.2.1.2; Document for Discussion and Decision, consisting of 4 pages.

3GPP TS 36.211 V13.0.0 (Dec. 2015) 3rd Generation Partnership Project; Technical Specification Group Radio Access Network; Evolved Universal Terrestrial Radio Access (E-UTRA); Physical Channels and Modulation (Release 13), consisting of 141 pages.

3GPP TS 36.213 V13.0.1 (Jan. 2016) 3rd Generation Partnership Project; Technical Specification Group Radio Access Network; Evolved Universal Terrestrial Radio Access (E-UTRA); Physical Layer Procedures (Release 13), consisting of 326 pages.

3GPP TS 38.802 V14.0.0 (Mar. 2017) 3rd Generation Partnership Project; Technical Specification Group Radio Access Network; Study on New Radio Access Technology Physical Layer Aspects (Release 14), consisting of 144 pages.

Notification of Transmittal of the International Preliminary Report on Patentability issued by the International Preliminary Examining Authority dated May 28, 2019 issued in corresponding PCT Application Serial No. PCT/IB2018/053133, consisting of 37 pages.

Source: CATT; 3GPP TSG RAN WG1 Meeting #85, Nanjing, China; May 23-27, 2016; "On Interference Measurement Enhancement for Multi-User MIMO Operation"; Agenda Item: 6.2.3.2.3; Document for Discussion and Decision, consisting of 5 pages.

\* cited by examiner

Signaling, by a base station, to a UE: a first Non-Zero Power (NZP) CSI-reference signal (RS) configuration for channel measurement; a second NZP CSI-RS configuration for interference measurement; and a CSI interference measurement (CSI-IM) configuration for interference measurement
S100

Sending a CSI feedback request for CSI measurement and feedback based on the first and second configurations NZP CSI-RS configurations for NZP CSI-RS resources and the CSI-IM configuration
S102

Transmitting K+1 NZP CSI-RS over the configured K+1 NZP CSI-RS resources
S104

Receiving, by the base station, a CSI report from the UE, the CSI report being based at least in part on the signaled first NZP CSI-RS configuration, the second NZP CSI-RS configuration, and the CSI-IM configuration
S106

Transmitting data with the reported CSI to the UE
S108

FIG. 10

INTERFERENCE MEASUREMENTS AND CHANNEL STATE INFORMATION FEEDBACK FOR MULTI-USER MULTIPLE-IN MULTIPLE-OUT

CROSS-REFERENCE TO RELATED APPLICATION

This application is a continuation of and claims priority to International Application No. PCT/IB2018/053133, filed May 4, 2018, entitled "INTERFERENCE MEASUREMENTS AND CHANNEL STATE INFORMATION FEEDBACK FOR MULTI-USER MULTIPLE-IN MULTIPLE-OUT," which claims priority to U.S. Provisional Application No. 62/502,454, filed May 5, 2017 entitled "INTERFERENCE MEASUREMENTS AND CSI FEEDBACK FOR MU-MIMO," the entireties of both of which are incorporated herein by reference.

TECHNICAL FIELD

Wireless communication and in particular, to interference measurements for multi-user multiple-in multiple-output (MU-MIMO) devices.

BACKGROUND

The next generation mobile wireless communication system (5G) or new radio (NR), may support a diverse set of use cases and a diverse set of deployment scenarios. The later includes deployment at both low frequencies (100 s of MHz), similar to existing (Long Term Evolution) LTE systems, and very high frequencies (e.g., mm waves in the tens of GHz). Similar to LTE, NR may use Orthogonal Frequency Division Multiplexing (OFDM) in the downlink (i.e., from a network node, gNB, eNB, or base station (BS), to a wireless device (WD)). In the uplink (i.e., from wireless device to network node), both OFDM and Discrete Fourier Transform (DFT)-spread OFDM (DFT-S-OFDM), also known as single-carrier frequency division multiple access (SC-FDMA) in LTE, may be supported.

The basic NR physical resource can be seen as a time-frequency grid similar to the grid in LTE as illustrated in FIG. 1, which is a block diagram of LTE physical resources, where each resource element corresponds to one OFDM subcarrier during one OFDM symbol interval. Although a subcarrier spacing of $\Delta f$ 15 kHz is shown in FIG. 1, different subcarrier spacing values are supported in NR. The supported subcarrier spacing values (also referred to as different numerologies) in NR are given by $\Delta f$ $(15 \times 2^{\alpha})$ kHz where a is a non-negative integer.

Furthermore, the resource allocation in LTE is typically described in terms of resource blocks (RBs), where a resource block corresponds to one slot (0.5 ms) in the time domain and twelve contiguous subcarriers in the frequency domain. Resource blocks are numbered in the frequency domain, starting with 0 from one end of the system bandwidth. For NR, resource allocation is described in terms of resource blocks in frequency domain and OFDM symbols in time domain. A resource block in NR may also be twelve subcarriers in frequency. A RB is also referred to as physical RB (PRB) herein. In the time domain, downlink and uplink transmissions in NR may be organized into equally-sized subframes similar to LTE as shown in FIG. 2, which is a block diagram of the LTE time-domain structure with 15 kHz subcarrier spacing. In NR, a subframe may be further divided into multiple slots of equal duration. Data scheduling in NR can be either on a subframe basis as in LTE, or on a slot basis. In NR, subframe length may be fixed at 1 ms regardless of the numerology used. In NR, the slot duration for a numerology of $(15 \times 2^{\alpha})$ kHz may be given by $\frac{1}{2}^{\alpha}$ ms assuming 14 OFDM symbols per slot, and the number of slots per subframe depends on the numerology. For convenience, subframe is used herein.

Downlink transmissions are dynamically scheduled, i.e., in each subframe the gNB transmits downlink control information (DCI) about which data is to be transmitted to and which resource blocks in the current downlink subframe the data is transmitted on. This control signaling is typically transmitted in the first one or two OFDM symbols in each subframe in NR. The control information may be carried on Physical Downlink Control Channel (PDCCH) and data may be carried on Physical Downlink Shared Channel (PDSCH). A wireless device first detects and decodes PDCCH and if a PDCCH is decoded successfully, the wireless device decodes the corresponding PDSCH based on the decoded control information in the PDCCH.

Uplink data transmissions may also be dynamically scheduled using PDCCH. Similar to downlink, a wireless device first decodes uplink grants in PDCCH and then transmits data over the Physical Uplink Shared Channel (PUSCH) based the decoded control information in the uplink grant such as modulation order, coding rate, uplink resource allocation, and etc.

Spatial Multiplexing

Multi-antenna techniques can significantly increase the data rates and reliability of a wireless communication system. The performance may be in particular improved if both the transmitter and the receiver are equipped with multiple antennas, which results in a multiple-input multiple-output (MIMO) communication channel. Such systems and/or related techniques are commonly referred to as MIMO. A core component in LTE and NR is the support of MIMO antenna deployments and MIMO related techniques. Spatial multiplexing is one of the MIMO techniques used to achieve high data rates in favorable channel conditions. An illustration of the spatial multiplexing operation is provided in FIG. 3, which illustrates an exemplary transmission structure of precoded spatial multiplexing mode in LTE.

As seen in FIG. 3, the information carrying symbol vector $s \leq [s_1, s_2, \ldots, s_r]^T$ is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. Each symbol in s $[s_1, s_2, \ldots, s_r]^T$ corresponds to a MIMO layer and r may be referred to as the transmission rank. In this way, spatial multiplexing may be achieved since multiple symbols can be transmitted simultaneously over the same time/frequency resource element (RE). The number of symbols r is typically adapted to suit the current channel properties.

The received signal at a UE with $N_R$ receive antennas at a certain RE n is given by $$y_n H_n W s + e_n$$

where $y_n$ is a $N_R \times 1$ received signal vector, $H_n$ a $N_R \times N_T$ channel matrix at the RE, $e_n$ is a $N_R \times 1$ noise and interference vector received at the RE by the UE. The precoder W can be a wideband precoder, which is constant over frequency, or frequency selective, i.e., different over frequency. The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference may be reduced.

The transmission rank, and thus the number of spatially multiplexed layers, is reflected in the number of columns of the precoder. The transmission rank may also be dependent on the Signal to Noise plus Interference Ratio (SINR) observed at the wireless device. Typically, a higher SINR is required for transmissions with higher ranks. For efficient performance, it may be important that a transmission rank that matches the channel properties as well as the interference is selected.

Channel State Information Reference Signals (CSI-RS)

In LTE, CSI-RS was introduced for channel estimations in the downlink for transmission modes 9 and 10. A unique CSI-RS may be allocated to each network node transmit antenna (or antenna port) and may be used by a UE to measure downlink channel associated with each of transmit antenna ports. CSI reference signals are defined for one to 32 antenna ports. The antenna ports sometimes are also referred to as CSI-RS ports. CSI-RS are transmitted in certain REs and subframes. FIG. 4 is a block diagram of REs available for CSI-RS allocation in each PRB in LTE. FIG. 4 shows the REs available for CSI-RS allocations in each PRB in LTE. Up to 40 REs can be configured for CSI-RS.

For two antenna ports, a CSI-RS for each antenna port may be allocated with two REs in the same subcarrrier and in two adjacent OFDM symbols in each PRB. CSI-RS signals for two antenna ports are multiplexed using a length two orthogonal cover codes (OCC), also referred to as OCC2. Thus, for 2 antenna ports, there are 20 different patterns available within a subframe. FIGS. 5 and 6 show an example of CSI-RS resource for 2 and 4 ports in LTE, respectively.

By measuring CSI-RS, a wireless device can estimate the channel the CSI-RS is traversing including the radio propagation channel and antenna gains. This type of CSI-RS may also be referred to as Non-Zero Power (NZP) CSI-RS. In addition to NZP CSI-RS, Zero Power (ZP) CSI-RS was introduced in LTE. ZP CSI-RS may be defined on one or more 4-port CSI-RS resource. The purpose was to indicate to a wireless device that the associated REs are muted at the network node. If the ZP CSI-RS may be allocated to be fully overlapping with NZP CSI-RS in an adjacent cell to improve channel estimation by wireless devices in the adjacent cell since there is no interference created by this cell. An example of ZP-CSI-RS resource is shown in FIG. 7, where the ZP CSI-RS occupies 8 REs per PRB (i.e., two 4-port CSI-RS resources). FIG. 7 is therefore a block diagram of NZP CSI-RS and ZP CSI-RS.

In LTE release (Rel) 11, CSI interference measurement (CSI-IM) resource was also introduced for a wireless device to measure interference. A CSI-IM resource may be defined as a 4-port CSI-RS resource that may be also fully overlapped with ZP CSI-RS. A CSI process may be defined by a NZP CSI-RS resource for channel estimation and an CSI-IM resource for interference and noise estimation. A wireless device can estimate the effective channel and noise plus interference for a CSI-RS process and consequently determine the rank, precoding matrix, and the channel quality. FIG. 8 is a block diagram of NZP CSI-RS, ZP CSI-RS and CSI-IM.

CSI Feedback

For CSI feedback, LTE has adopted an implicit CSI mechanism where a wireless device feedback of the downlink channel state information is in terms of a transmission rank indicator (RI), a precoder matrix indicator (PMI), and one or two channel quality indicator(s) (CQI). The CQI/RI/PMI report can be wideband or frequency selective depending on which reporting mode that is configured. The RI corresponds to a recommended number of layers that are to be spatially multiplexed and thus transmitted in parallel over the effective channel. The PMI identifies a recommended precoder. The CQI represents a recommended modulation level (i.e., QPSK, 16QAM, etc.) and coding rate for each transport block. LTE supports transmission of one or two transport blocks (i.e., separately encoded blocks of information) to a wireless device in a subframe. There is thus a relation between a CQI and an SINR of the spatial layers over which the transport block or blocks are transmitted.

Beamformed CSI-RS

The beamformed (or precoded) CSI-RS concept was introduced in LTE, in which a CSI-RS is precoded and transmitted over more than one antenna port. This is in contrast with non-precoded CSI-RS in which each CSI-RS is transmitted on one antenna port. Beamformed CSI-RS can be used when the direction of a wireless device or wireless devices is roughly known so that CSI-RS can be transmitted in a narrow beam or beams to reach the wireless device or wireless devices. This can improve CSI-RS coverage with increased beamforming gain and also reduce CSI-RS resource and CSI feedback overhead.

The non-precoded CSI-RS based feedback is referred as "CLASS A" CSI feedback, while beamformed CSI-RS operation is referred to as "Class B" CSI feedback. In CLASS B CSI feedback, a wireless device can be configured with up to 8 CSI-RS resources (i.e., multiple CSI-RS beams), each with up to 8 ports. The wireless device reports back a CSI-RS resource indicator (CRI) to indicate the best beam and the corresponding CQI, RI, PMI within the selected beam.

A wireless device configured for Class B operation with one CSI-RS resource of up to 8 ports is a special case, in which each CSI-RS port may correspond to a particular beam. In that case, a wireless device may be configured to use a port selection and combining codebook.

Hybrid Class A and Class B CSI reporting may also be supported. In one scenario, Class A is used to identify the approximate direction of a wireless device while Class B is used to "fine tune" the CSI.

MU-MIMO

When all the data layers are transmitted to one wireless device, it may be referred to as single user multiple-in multiple-output or SU-MIMO. On the other hand, when the data layers are transmitted to multiple wireless devices, it may be referred to as multi-user MIMO or MU-MIMO. MU-MIMO is possible when, for example, two wireless devices are located in different areas of a cell such that they can be separated through different precoders (or beams) at the network node, e.g., eNB/gNB. The two wireless devices may be served on the same time-frequency resources (e.g., PRBs) by using different precoders or beams. MU-MIMO may require much more accurate downlink channel information than in SU-MIMO in order for the network node to use precoding to separate the wireless devices, i.e., reducing cross interference to the co-scheduled wireless devices. For that purpose, advanced CSI feedback was introduced in LTE in which a new codebook was defined trying to capture more accurate downlink channel information. In NR, a type II codebook may be designed for the same purpose.

MU-MIMO Interference

In MU-MIMO, in addition to interference from other cells, also referred to as inter-cell interference, interference among UEs participating in MU-MIMO may also be experienced by the wireless devices, also referred to as intra-cell interference or MU interference. MU interference may be more difficult to measure or estimate due to the dynamic nature of transmissions to wireless devices paired in MU-MIMO. Assuming there are K+1 wireless devices sharing the same time-frequency resources in a data transmission, the received signal at the kth (k1, 2, . . . , K+1) wireless device and at the ith RE can be expressed as $$y^k(i)=H^k(i)W^k(i)s^k(i)+H^k(i)\Sigma_{m\neq k}^{K+1}W^m(i)s^m(i)+e^k(i)$$

where $H^k(i)$, $W^k(i)$, $s^k(i)$ are the channel matrix, the precoding matrix and the data vector associated with the kth wireless device at the ith RE. MU interference experienced at the kth wireless device may be expressed as $$I_{MU}^k=H^k(i)\Sigma_{m\neq k}^{K+1}W_m(i)s^m(i)$$

and $e^k(i)$ may be the noise plus inter-cell interference received at the kth wireless device. Only $e^k(i)$ is typically considered in the existing LTE CSI feedback. Existing CSI reporting defined in LTE is mainly for SU-MIMO operation, in which a wireless device is configured with one CSI-RS resource for channel measurement and one CSI-IM resource for interference measurement. With the number of supported antenna ports increasing in both LTE and NR, supporting MU-MIMO becomes even more important. Existing CSI feedback in LTE may not be sufficient to support MU-MIMO. Theoretically, ZP-CSI-RS can be used by eNB/gNB to emulate MU-MIMO interference by injecting MU interference in the ZP CSI-RS resource. However, a separate ZP CSI-RS may be generally needed for each wireless device and when many wireless devices are participating MU-MIMO, the required ZP CSI-RS resources can be large. Unfortunately, this may significantly increase the overhead of ZP CSI-RS.

SUMMARY

Some embodiments advantageously provide methods and apparatuses for interference measurements and CSI feedback for MU-MIMO.

According to a first method/process:
1. The network node first obtains SU-MIMO CSI from serving wireless devices as is normally done in LTE or NR, and determines K+1 (K>0) wireless device candidates for MU-MIMO.
2. The network node configures each of the K+1 wireless device candidates with K+1 NZP CSI-RS resources and one common ZP CSI-RS as CSI-IM in the same subframe or slot and request CSI report from each wireless device. The network node may also configure an Energy Per RE (EPRE) power ratio, $$\beta = \frac{EPRE_{PDSCH}}{EPRE_{NZP\ CSI-RS}},$$

between PDSCH and NZP CSI-RS for each of the K+1 NZP CSI-RS.

3. For each wireless device, the network node also indicates one of the K+1 NZP CSI-RS resources for channel measurement and the remaining K NZP CSI-RS for interference measurements. Each wireless device is also configured with a codebook for CSI feedback.
4. Each wireless device measures inter-cell interference, $I_{inter-cell}$, over the ZP-CSI-RS resource, and MU-MIMO interference, $I_m$ (m=1, . . . K), on each of the K NZP CSI-RS resources configured for interference measurement by assuming isotropical interference, i.e., power averaging over all ports in a CSI-RS resource.
5. Each wireless device estimates the total interference as $I=\Sigma_{m=1}^{K}(I_m-I_{inter-cell})+I_{inter-cell}$ and calculates CSI according to the configured codebook.

According to a second method/process:
1. Similar to the first step in the first method (method 1) above, i.e., Network node first obtains SU-MIMO CSI from serving wireless devices as is normally done in LTE or NR, and determines K+1 wireless device candidates for MU-MIMO.
2. The network node configures each of the K+1 (K>0) wireless device candidates with one NZP CSI-RS resource and one ZP CSI-RS. The ZP CSI-RS is common to the K+1 wireless devices in the same subframe or slot and request CSI report from each wireless device. In one or more embodiments, the network node also signals an Energy Per RE (EPRE) power ratio, $$\beta = \frac{EPRE_{PDSCH}}{EPRE_{NZP\ CSI-RS}},$$

between PDSCH and the NZP CSI-RS.

3. The network node transmits a signal representing a MU-MIMO signal for all of the K+1 wireless devices in the ZP CSI-RS resource, i.e., transmitting signal $\Sigma_{k=1}^{K+1}W^ks^k$ on the ZP CSI-RS resource, where $W^k$ and $s^k$ are the procoding matrix and signal associated with the kth wireless device.
4. Each wireless device measures interference, $I_{ZP}$, over the ZP-CSI-RS resource and estimates a precoded signal power, $p_s=\beta\cdot\|HW\|\Lambda2$, over the NZP CSI-RS resource, where H is the estimated channel matrix and W is the estimated precoding matrix based channel estimation on the NZP CSI-RS resource configured for channel estimation.
5. Each wireless device calculates CSI by assuming $I=I_{ZP}-p_s$ as the total interference and channel estimation H according to the configured codebook.

According to one aspect of the disclosure, a method for a UE is provided. The method includes receiving signaling, by the UE, the signaling including: a first Non-Zero Power (NZP) channel state information-reference signal (CSI-RS) configuration for channel measurement; a second NZP CSI-RS configuration for interference measurement; and a CSI interference measurement (CSI-IM) configuration for interference measurement; and estimating, by the UE, CSI based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the receiving signaling further includes receiving the signaling including a codebook configuration. In some embodiments, the estimating the CSI further comprises estimating the CSI based on the codebook configuration. In some embodiments, the method further comprises receiving, by the UE, a CSI feedback request for CSI based on at least the first NZP CSI-RS configuration, the second NZP CSI-RS configuration, the CSI-IM configuration and the codebook configuration. In some embodiments, the method further comprises receiving, by the UE, a CSI feedback request for CSI based on at least the first NZP CSI-RS configuration, the second NZP CSI-RS configuration, and the CSI-IM configuration. In some embodiments, the estimating the CSI further includes measuring a downlink channel on a first NZP CSI-RS resource corresponding to the first NZP CSI-RS configuration. In some embodiments, the estimating the CSI further includes measuring interference on each of K NZP CSI-RS resources corresponding to the second NZP CSI-RS configuration. In some embodiments, the measuring the interference on each of the K NZP CSI-RS resources results in K interference power estimates. In some embodiments, each of the K interference power estimates is scaled according to a power scaling factor associated with the K NZP CSI-RS resources. In some embodiments, the second NZP CSI-RS configuration comprises a power scaling factor for each of K NZP CSI-RS resources configured by the second NZP CSI-RS configuration for the interference measurement. In some embodiments, the estimating the CSI includes measuring interference on at least one CSI-IM resource corresponding to the CSI-IM configuration. In some embodiments, the measuring the interference on the at least one CSI-IM resource results in at least one interference power estimate. In some embodiments, the method further comprises adding at least the K interference power estimates based on the K NZP CSI-RS resources and the at least one interference power estimate based on the at least one CSI-IM resource to obtain a combined interference estimate. In some embodiments, the estimated CSI is based on the combined interference estimate and a measured downlink channel. In some embodiments, the measured downlink channel is measured on a first NZP CSI-RS resource corresponding to the first NZP CSI-RS configuration. In some embodiments, the method further comprises receiving, by the UE, a CSI feedback request comprising a codebook configuration.

According to another aspect of the disclosure, a UE comprising processing circuitry is provided. The processing circuitry is configured to cause the UE to: receive signaling, the signaling including: a first Non-Zero Power (NZP) channel state information (CSI)-reference signal (RS) configuration for channel measurement; a second NZP CSI-RS configuration for interference measurement; and a CSI interference measurement (CSI-IM) configuration for interference measurement; and estimate CSI based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the received signaling further includes a codebook configuration. In some embodiments, the processing circuitry is configured to cause the UE to estimate the CSI by being further configured to estimate the CSI based on the codebook configuration. In some embodiments, the processing circuitry is further configured to cause the UE to receive a CSI feedback request for CSI based on at least the first NZP CSI-RS configuration, the second NZP CSI-RS configuration, the CSI-IM configuration and the codebook configuration. In some embodiments, the processing circuitry is further configured to cause the UE to receive a CSI feedback request for CSI based on at least the first NZP CSI-RS configuration, the second NZP CSI-RS configuration, and the CSI-IM configuration. In some embodiments, the processing circuitry is configured to cause the UE to estimate the CSI by being further configured to measure a downlink channel on a first NZP CSI-RS resource corresponding to the first NZP CSI-RS configuration. In some embodiments, the processing circuitry is configured to cause the UE to estimate the CSI by being further configured to measure interference on each of K NZP CSI-RS resources corresponding to the second NZP CSI-RS configuration. In some embodiments, the processing circuitry is configured to measure the interference on each of the K NZP CSI-RS resources resulting in K interference power estimates. In some embodiments, the processing circuitry is configured to scale each of the K interference power estimates according to a power scaling factor associated with the K NZP CSI-RS resources. In some embodiments, the second NZP CSI-RS configuration comprises a power scaling factor for each of K NZP CSI-RS resources configured by the second NZP CSI-RS configuration for the interference measurement. In some embodiments, the processing circuitry is configured to cause the UE to estimate the CSI by being further configured to measure interference on at least one CSI-IM resource corresponding to the CSI-IM configuration. In some embodiments, the processing circuitry is configured to measure the interference on the at least one CSI-IM resource resulting in at least one interference power estimate. In some embodiments, the processing circuitry is configured to cause the UE to add at least the K interference power estimates based on the K NZP CSI-RS resources and the at least one interference power estimate based on the at least one CSI-IM resource to obtain a combined interference estimate. In some embodiments, the processing circuitry is configured to cause the UE to estimate the CSI based on the combined interference estimate and a measured downlink channel. In some embodiments, the measured downlink channel is measured on a first NZP CSI-RS resource corresponding to the first NZP CSI-RS configuration. In some embodiments, the processing circuitry is further configured to cause the UE to receive a CSI feedback request comprising a codebook configuration.

According to yet another aspect of the disclosure, a method for a base station is provided. The method includes signaling, by the base station, to a user equipment, UE: a first Non-Zero Power (NZP) channel state information (CSI)- reference signal (RS) configuration for channel measurement; a second NZP CSI-RS configuration for interference measurement; and a CSI interference measurement (CSI-IM) configuration for interference measurement; and receiving, by the base station, a CSI report from the UE, the CSI report being based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the signaling further includes signaling a codebook configuration. In some embodiments, the received CSI report is based at least in part on the signaled codebook configuration. In some embodiments, the method further includes sending, from the base station, a CSI feedback request to the UE for CSI based on at least the first NZP CSI-RS configuration, the second NZP CSI-RS configuration, the CSI-IM configuration, and the codebook configuration. In some embodiments, the method further includes sending, from the base station, a CSI feedback request to the UE for CSI based on at least the first NZP CSI-RS configuration, the second NZP CSI-RS configuration and the CSI-IM configuration. In some embodiments, the method further includes transmitting, from the base station, K+1 NZP CSI-reference signals (RSs) over K+1 NZP CSI-RS resources configured by the signaling of the first NZP CSI-RS configuration and the second NZP CSI-RS configuration. In some embodiments, the signaling, by the base station, to the UE includes signaling semi-statically over radio resource control signaling. In some embodiments, the sending, from the base station, the CSI feedback request to the UE includes sending the CSI feedback request dynamically over a downlink control channel. In some embodiments, the second NZP CSI-RS configuration comprises a power scaling factor for each of K NZP CSI-RS resources configured by the second NZP CSI-RS configuration for the interference measurement. In some embodiments, the received CSI report is based on a combined interference estimate and a measured downlink channel, the combined interference estimate being a sum of at least K interference power estimates based on K NZP CSI-RS resources configured by the second NZP CSI-RS configuration and at least one interference power estimate based on at least one CSI-IM resource configured by the CSI-IM configuration, and the measured downlink channel being based on a first NZP CSI-RS resource corresponding to the first NZP CSI-RS configuration. In some embodiments, the method further includes sending, from the base station, a CSI feedback request comprising a codebook configuration.

According to yet another aspect of the disclosure, a base station comprising processing circuitry is provided. The processing circuitry is configured to cause the base station to: signal to a UE: a first Non-Zero Power (NZP) channel state information (CSI)-reference signal (RS) configuration for channel measurement; a second NZP CSI-RS configuration for interference measurement; and a CSI interference measurement (CSI-IM) configuration for interference measurement; and receive a CSI report from the UE, the CSI report being based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments) the second NZP CSI-RS configuration is for multiple-user (MU) interference measurement. In some embodiments, the CSI-IM configuration is for inter-cell interference measurement. In some embodiments, the processing circuitry is configured to signal to the UE by being further configured to signal a codebook configuration. In some embodiments, the received CSI report is based at least in part on the signaled codebook configuration. In some embodiments, the processing circuitry is further configured to send a CSI feedback request to the UE for CSI based on at least the first NZP CSI-RS configuration, the second NZP CSI-RS configuration, the CSI-IM configuration, and the codebook configuration. In some embodiments, the processing circuitry is further configured to send a CSI feedback request to the UE for CSI based on at least the first NZP CSI-RS configuration, the second NZP CSI-RS configuration and the CSI-IM configuration. In some embodiments, the processing circuitry is further configured to transmit K+1 NZP CSI-reference signals (RSs) over K+1 NZP CSI-RS resources configured by the signaling of the first NZP CSI-RS configuration and the second NZP CSI-RS configuration. In some embodiments, the processing circuitry is configured to signal to the UE by being further configured to signal semi-statically over radio resource control signaling. In some embodiments, the processing circuitry is configured to send the CSI feedback request to the UE by being further configured to send the CSI feedback request dynamically over a downlink control channel. In some embodiments, the processing circuitry is configured to signal to the UE by being further configured to signal the second NZP CSI-RS configuration comprising a power scaling factor for each of K NZP CSI-RS resources configured by the second NZP CSI-RS configuration for the interference measurement. In some embodiments, the received CSI report is based on a combined interference estimate and a measured downlink channel, the combined interference estimate being a sum of at least K interference power estimates based on K NZP CSI-RS resources configured by the second NZP CSI-RS configuration and at least one interference power estimate based on at least one CSI-IM resource configured by the CSI-IM configuration, and the measured downlink channel being based on a first NZP CSI-RS resource corresponding to the first NZP CSI-RS configuration. In some embodiments, the processing circuitry is further configured to send a CSI feedback request comprising a codebook configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flow diagram of an exemplary configuration process of configuration code in accordance with the principles of the disclosure;

DETAILED DESCRIPTION

Figure 1:
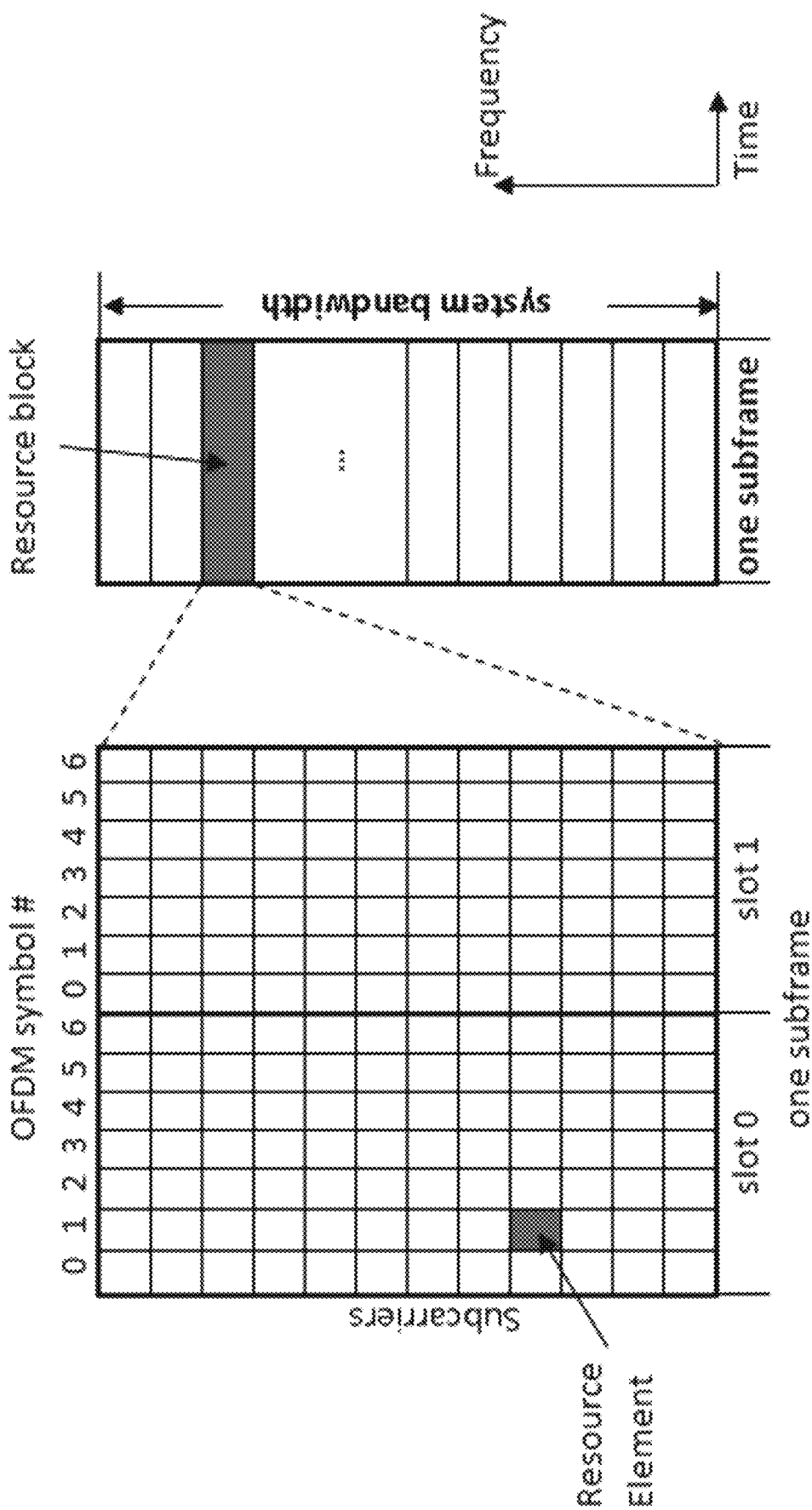
FIG. 1 is a block diagram of LTE physical resources.
Figure 2:
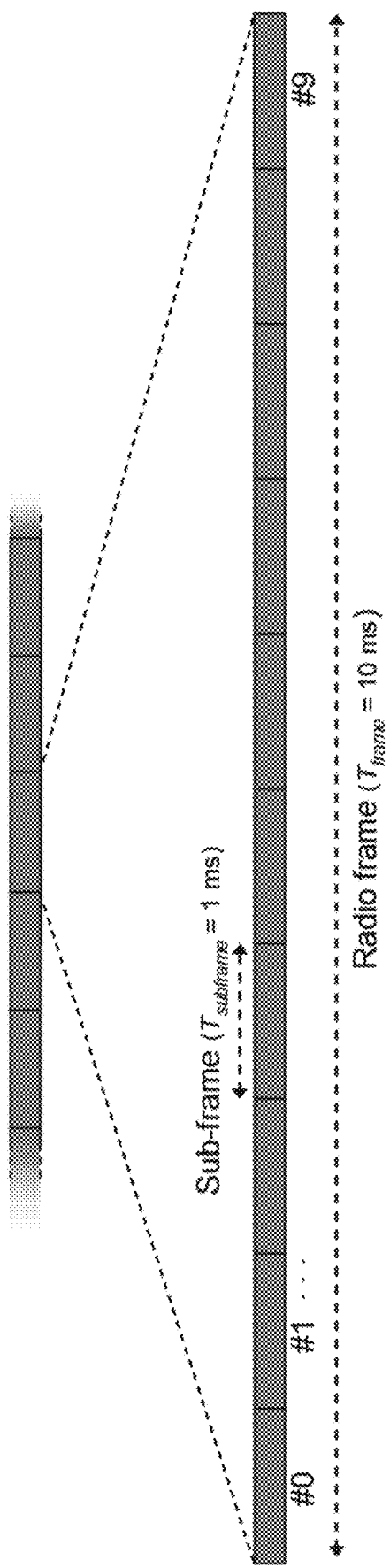
FIG. 2 is a block diagram of the LTE time-domain structure.
Figure 3:
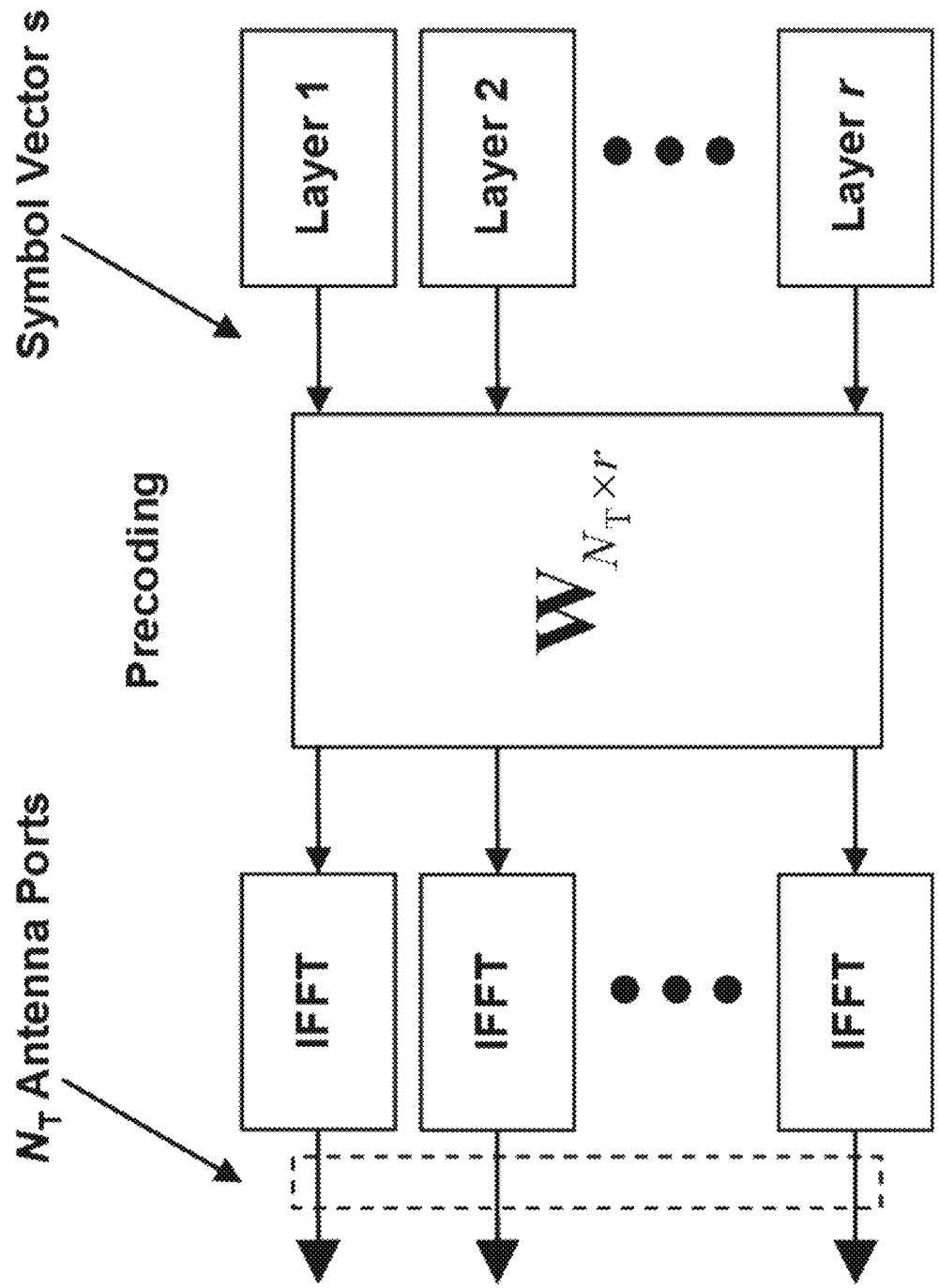
FIG. 3 is a block diagram of transmission structure of precoded spatial multiplexing mode in LTE.
Figure 4:
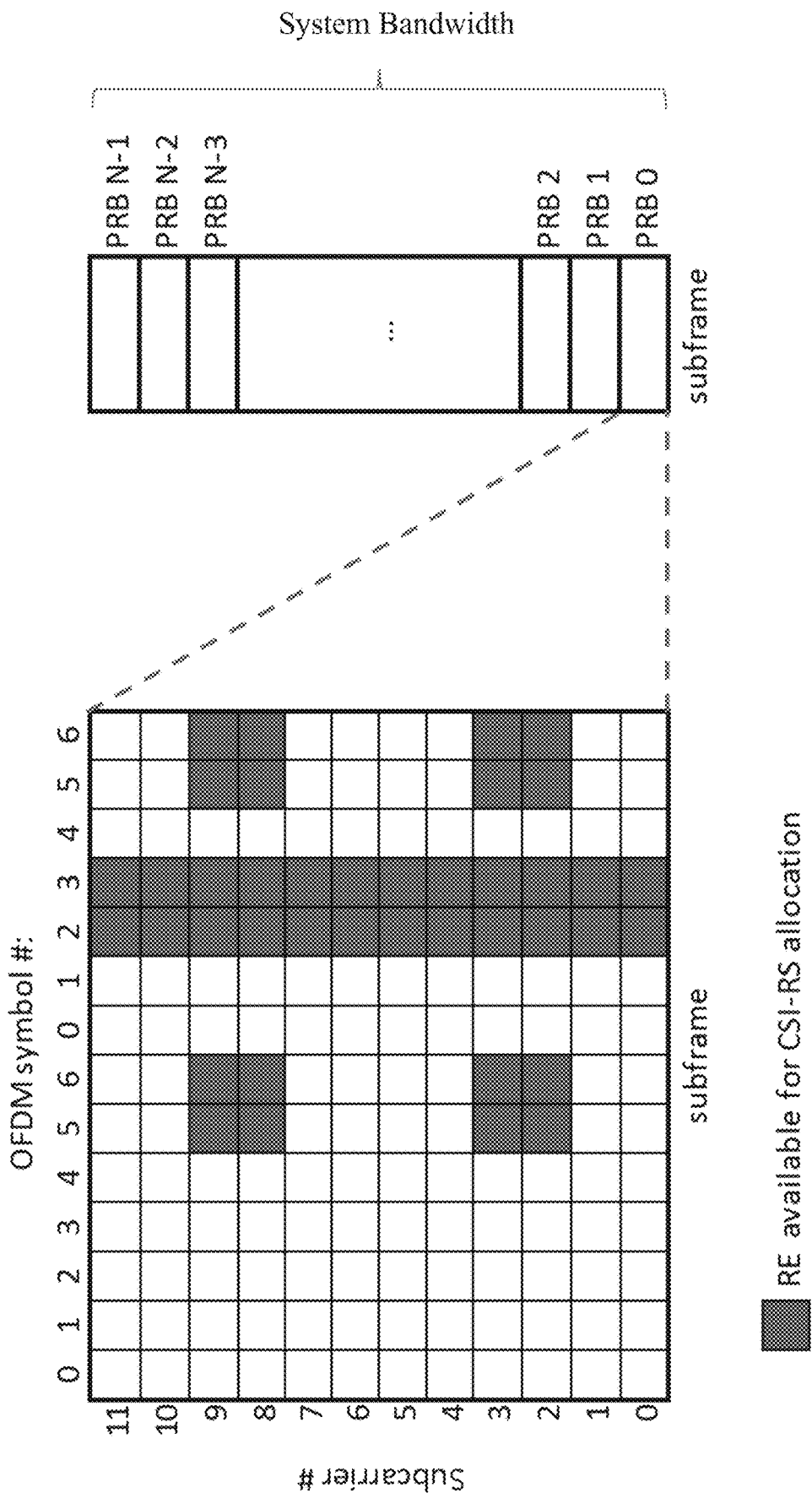
FIG. 4 is a block diagram of REs available for CSI-RS allocation in each PRB in LTE.
Figure 5:
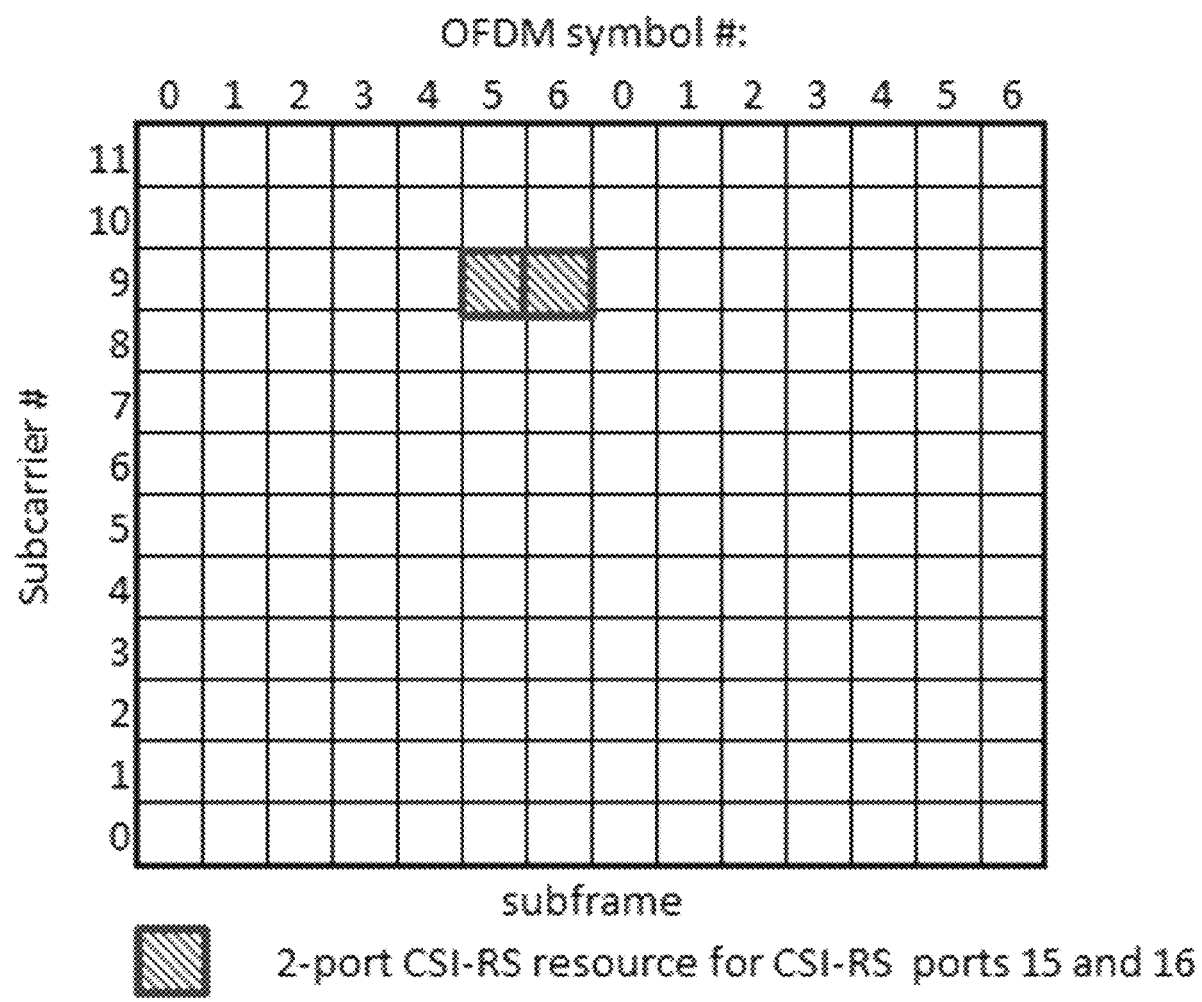
FIGS. 5 and 6 are block diagrams of an example of CSI-RS resource for two and four ports in LTE, respectively.
Figure 6:
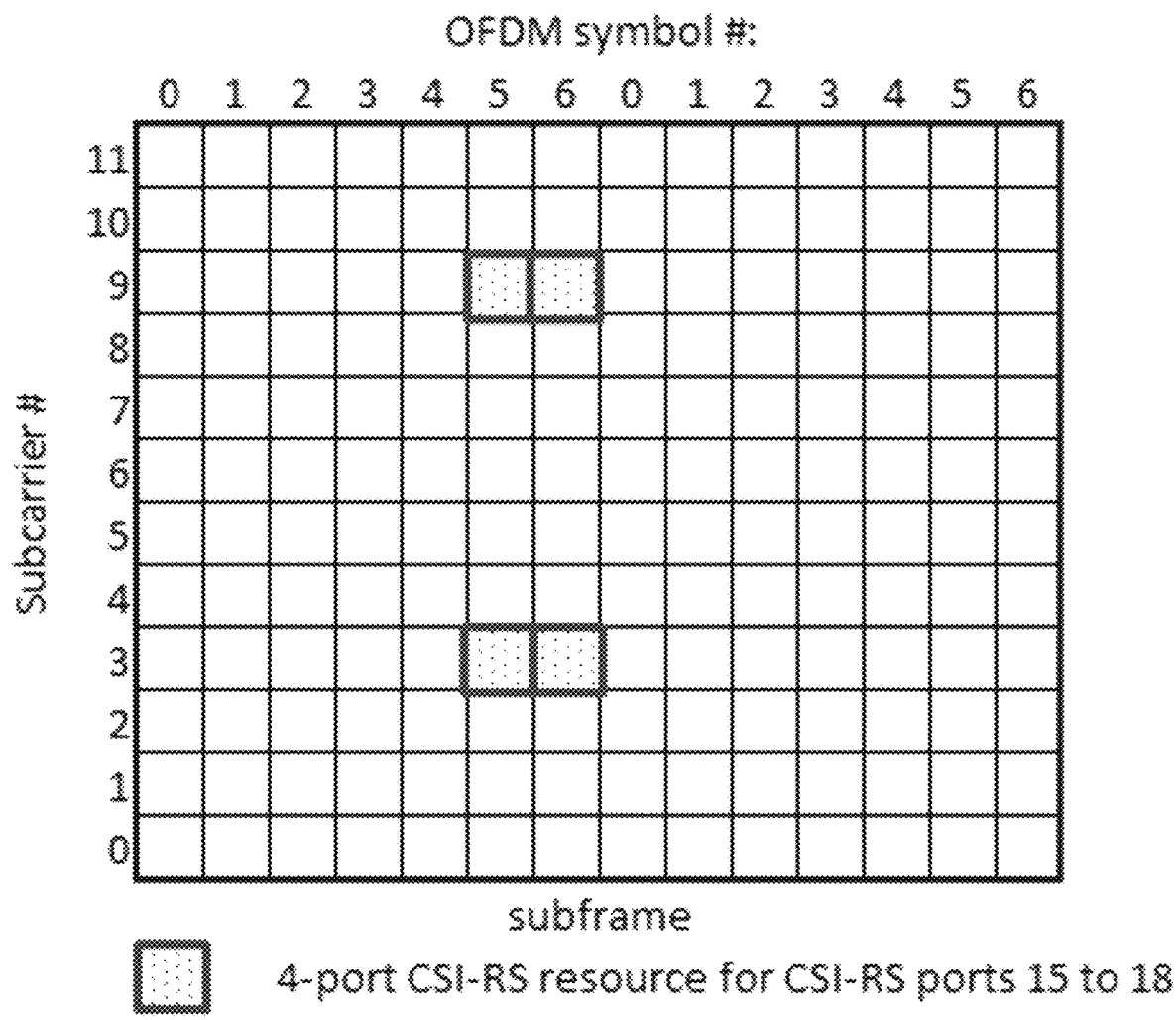
Figure 7:
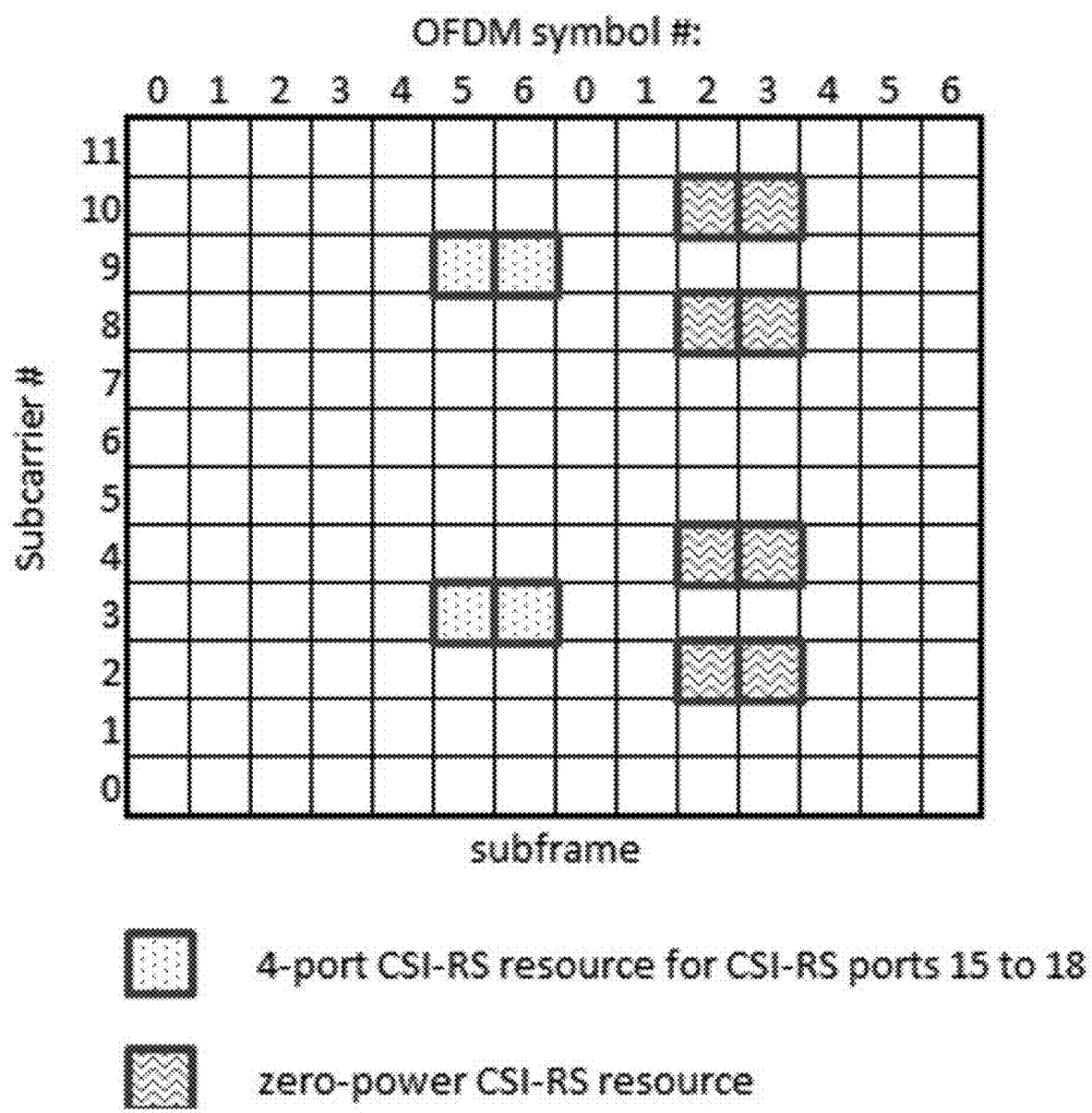
FIG. 7 is therefore a block diagram of NZP CSI-RS and ZP CSI-RS resources.
Figure 8:
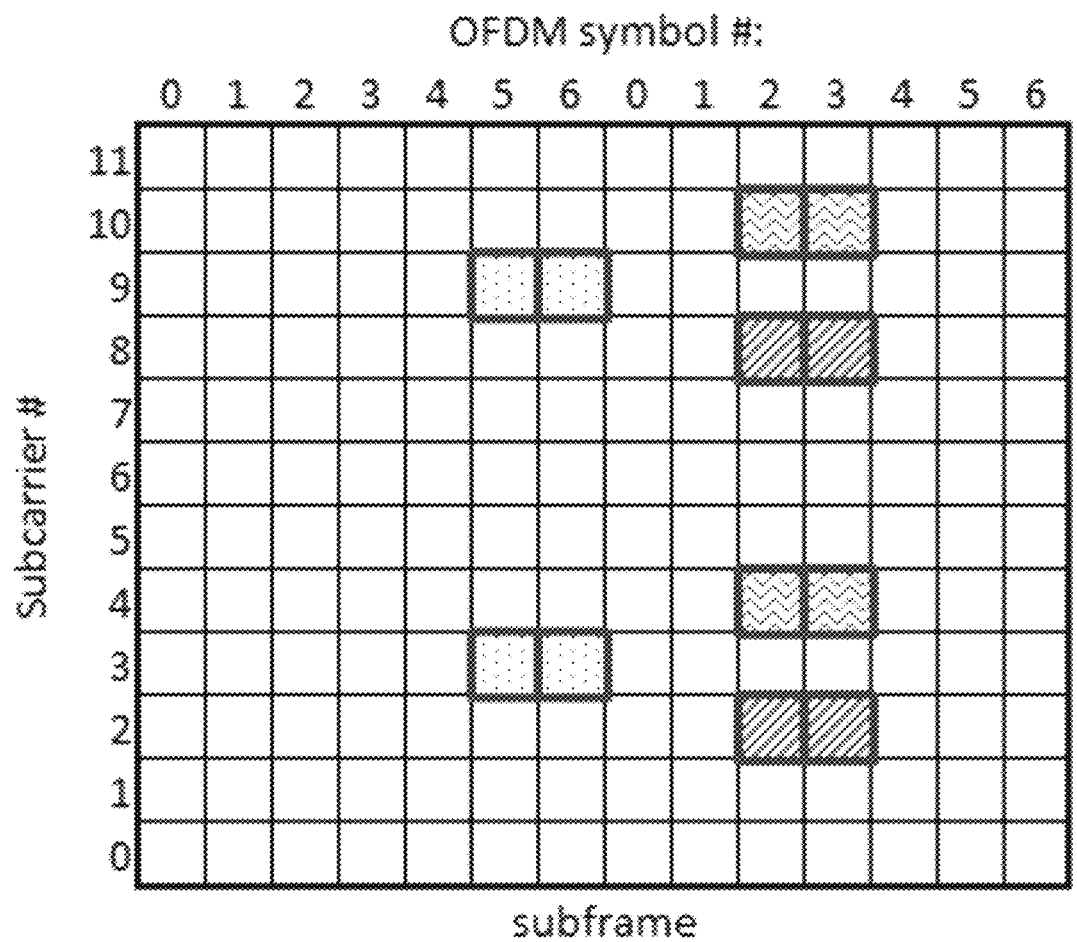
FIG. 8 is a block diagram of NZP CSI-RS, ZP CSI-RS and CSI-IM resources.

Note that although terminology from 3GPP LTE and NR (New Radio) may be been used in this disclosure to exemplify the embodiments in the disclosure, this should not be seen as limiting the scope of the disclosure to only the aforementioned systems. Other wireless systems may also benefit from exploiting the ideas covered within this disclosure.

Also note that terminology such as node, eNodeB/eNB/gNB and wireless device/UE should be considering non-limiting and does in particular not imply a certain hierarchical relation between the two; in general, "eNodeB"/"node" could be considered as a first device and "UE"/"wireless device" as a second device, and these two devices communicate with each other over some radio channel. Herein, the focus will be on wireless transmissions in the downlink, but the disclosure is equally applicable in the uplink.

The methods and processes described herein are efficient for interference measurement and CSI feedback for MU-MIMO. In one or more embodiments, methods/processes described herein use K+1 NZP CSI-RS resources for K+1 wireless devices in MU-MIMO and one common ZP CSI-RS resource. Therefore, the methods and processes described herein may be scalable in the sense that only one more NZP CSI-RS resource may be needed for each increased wireless device to participate in MU-MIMO. The once common ZP CSI-RS resource may still be used for each of these increased wireless devices.

In one or more embodiments, for a first method/process, other than interference estimation over additional NZP CSI-RS resources, the process may be similar for SU-MIMO CSI feedback such that minimal change may be required at a wireless device.

In one or more embodiments, for a second method/process, precoding is also taken into count in interference estimation due to network node transmission of emulated MU-MIMO interference and thus the interference estimation may be more accurate when compare to the first method.

Before describing in detail exemplary embodiments, it is noted that the embodiments reside primarily in combinations of components and processing steps related to methods, network nodes and wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 9:
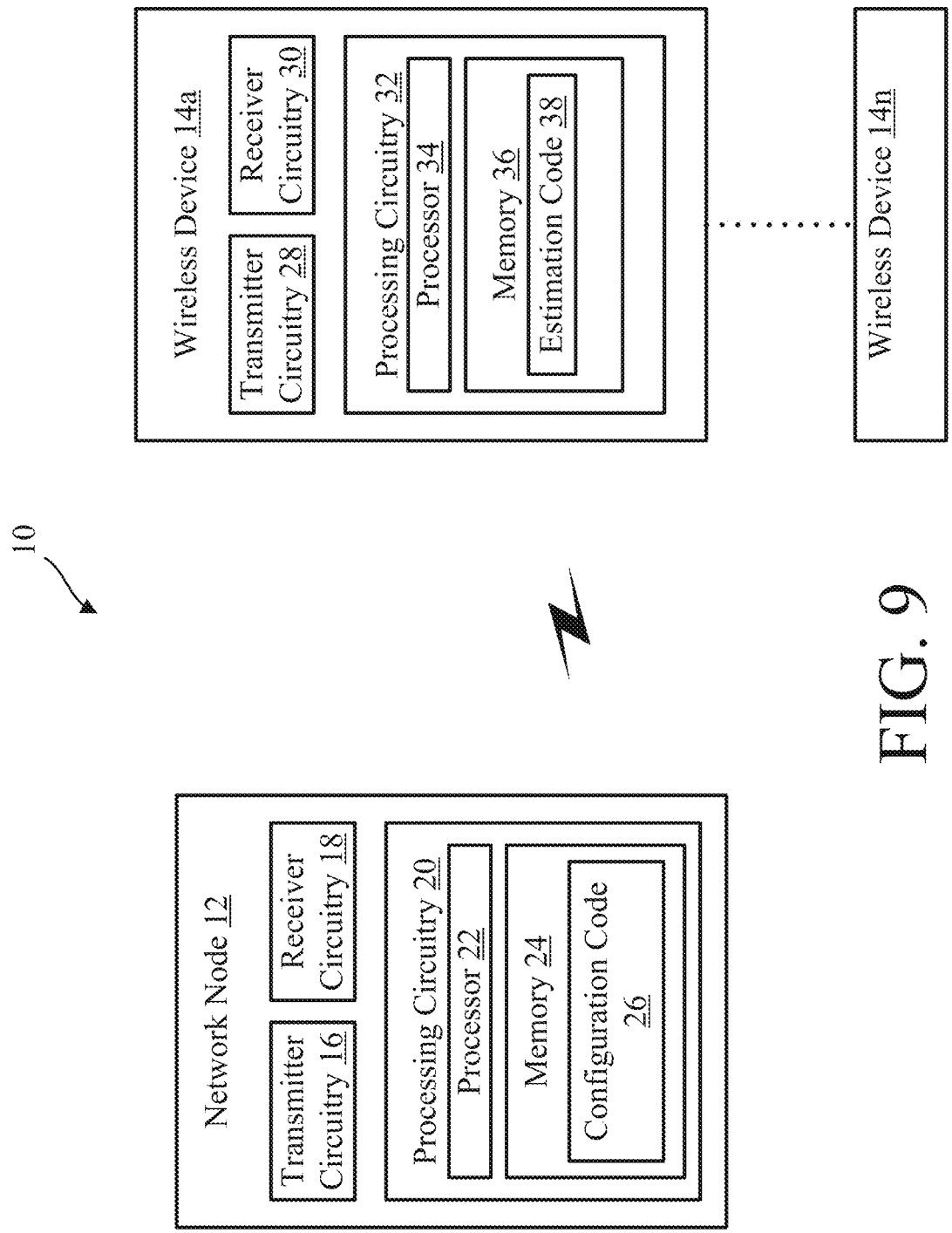
FIG. 9 is a block diagram of an exemplary system for interference measurement and CSI feedback configuration for multi-user (MU) multiple-in multiple-out (MIMO) in accordance with the principles of the disclosure.

Referring now to drawing figures in which like reference designators refer to like elements there is shown in FIG. 9 is a block diagram of an exemplary system for interference measurement and CSI feedback configuration for multi-user (MU) multiple-in multiple-out (MIMO) in accordance with the principles of the disclosure. System 10 includes one or more network nodes 12 and one or more wireless devices 14, in communication with each other via one or more communication networks, paths and/or links using one or more communication protocols, as described herein.

Network node 12 includes transmitter circuitry 16 and receiver circuitry 18 for communicating with wireless device 14, other nodes 12 and/or other entities in system 10. In one or more embodiments, transceiver circuitry 16 and/or receiver circuitry 18 include and/or is/are replaced by one or more communication interfaces. Network node 12 includes processing circuitry 20. The term "network node", such as "network node 12" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, gNodeB (gNB), multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc. The terms "network node" and "base station" may be used herein interchangeably.

Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions and processes described herein. Network node 12 includes memory 24 that is configured to store data, programmatic software code and/or other information described herein. In one or more embodiments, memory 24 is configured to store configuration code 26. For example, configuration code 26 includes instructions that, when executed by processor 22, causes processor 22 to perform the functions described herein such as the functions described with respect to FIGS. 10 and/or 13.

Wireless device 14 includes transmitter circuitry 28 and receiver circuitry 30 for communicating with network node 12, other wireless devices 14 and/or other entities in system 10. In one or more embodiments, transmitter circuitry 28 and/or receiver circuitry 30 include and/or is/are replaced by one or more communication interfaces. Wireless device 14 includes processing circuitry 32.

Processing circuitry 32 includes processor 34 and memory 36. In addition to a traditional processor and memory, processing circuitry 32 may include integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions and processes described herein. Wireless device 14 includes memory 36 that is configured to store data, programmatic software code and/or other information described herein. In one or more embodiments, memory 36 is configured to store estimation code 38. For example, estimation code 38 includes instructions that, when executed by processor 34, causes processor 34 to perform the functions described herein such as the functions described with respect to FIGS. 12 and/or 15.

The terms "wireless device" and "UE" may be used herein interchangeably. Wireless device 14 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Although embodiments are described herein with reference to certain functions being performed by network node 12 and/or wireless device 14, it is understood that the functions can be performed in other network nodes and elements. It is also understood that the functions of the network node 12 and/or wireless device 14 can be distributed across the network cloud, such as the Internet or access network backhaul network, so that other nodes can perform one or more functions or even parts of functions described herein.

In one or more embodiments, the configuration process at network node 12 and the estimation process at each WD 14 are described below, according to a first exemplary aspect of the disclosure.

At network node 12

Step 1: Obtain SU-MIMO CSI;

Step 2: Determine K+1 WDs 14 as MU-MIMO candidates, configure each candidate with K+1 NZP CSI-RS resources and one CSI-IM resource;

Step 3: Indicate which NZP CSI-RS is for channel measurement;

Step 4: Request new CSI feedback with a codebook;

Step 5: Receive MU-MIMO CSI from each WD 14;

Step 6: Perform MU-MIMO transmission to the K+1 WDs 14 using the new CSIs.

At WD 14

Step 1: Receive configuration with K+1 NZP CSI-RS resources and one CSI-IM and receive indication of one out of the K+1 NZP CSI-RS is for channel measurement;

Step 2: Receive a CSI request from network node 12;

Step 3: Measure channel on the NZP CSI-RS resource as indicated;

Step 4: Measure inter-cell interference on CSI-IM

Step 5: Measure K MU interferences on the remaining K NZP CSI-RS resources, and subtract measured inter-cell interference from each of the K measured interferences, resulting in K MU interferences;

Step 6: Add the K MU-interferences and the measured inter-cell interference, resulting in the total estimated interference;

Step 7: Calculate the CSI based on the measured channel and the total estimated interference according to the configured codebook; and Step 8: feedback the CSI (MU-MIMO CSI) to network node 12.

FIG. 10 is a flow diagram of an exemplary configuration process of configuration code 26 of the network node 12 in accordance with the principles of the disclosure, and, in particular, in accordance with a first exemplary aspect of the disclosure. Processing circuitry 20 of network node/base station 12 is configured to signal to a wireless device/UE 14: a first Non-Zero Power (NZP) CSI-reference signal (RS) configuration for channel measurement; a second NZP CSI-RS configuration for interference measurement; and a CSI interference measurement (CSI-IM) configuration for interference measurement (Block S100). In some embodiments, the second NZP CSI-RS configuration is for multiple user (MU) interference measurements on K NZP-CSI resources, where K>1. In some embodiments, the signaling includes a codebook configuration. In some embodiments, the CSI-IM configuration is for inter-cell interference measurements. In addition, the energy per RE ratio (EPRE) β between PDSCH and NZP CSI-RS for each NZP CSI-RS may also be signaled in the first and second NZP CSI-RS configurations.

Processing circuitry 20 is optionally configured to send a CSI feedback request to the wireless device 14 for CSI measurement and feedback based on the first and second configurations NZP CSI-RS configurations for NZP CSI-RS resources and the CSI-IM configuration (Block S102). Processing circuitry 20 is optionally configured to transmit K+1 NZP CSI-RS over the configured K+1 NZP CSI-RS resources (Block S104). Processing circuitry 20 is configured to receive a CSI report from the UE/wireless device 14 (Block S106). In one embodiment, the CSI report is based at least in part on the signaled first NZP CSI-RS configuration, the second NZP CSI-RS configuration, and the CSI-IM configuration. In some embodiments, the CSI report is further based on the codebook configuration. Processing circuitry 20 is optionally configured to transmit data with the reported CSI to the wireless device 14 (Block S108). In other words, in one or more embodiments of the configuration process, i.e., Method 1, network node 1 (e.g., network node 12) first obtains SU-MIMO CSI (i.e. CRI, RI, PMI, CQI) from serving wireless devices 14 as is normally done in LTE or NR. Network node 12 then determines wireless device 14 candidates for MU-MIMO based on the SU-MIMO CSI. Assuming that K+1 wireless devices 14 are selected as MU-MIMO candidate, i.e., they can potentially be scheduled together in a subframe with the same time-frequency resources. To obtain MU-MIMO CQI by taking into account the MU interference, network node 12 configures each of the K+1 wireless device 14 candidates with K+1 NZP CSI-RS resources and one common ZP CSI-RS as CSI-IM in the same subframe or slot and request CSI report from each wireless device 14.

For each wireless device 14, network node 12 also indicates one of the K+1 NZP CSI-RS resource for channel measurement and the remaining K NZP CSI-RS resources for interference measurements. Each wireless device 14 is also configured with a codebook for CSI feedback.

After receiving the configuration and CSI feedback request, each wireless device 14 estimates the downlink channel H and measures inter-cell interference, $I_{inter-cell}$, over the ZP-CSI-RS resource. In addition, each wireless device 14 also measures MU-MIMO interference, $I_m$ (m=1, . . . K), on each of the K NZP CSI-RS resources configured for interference measurement by assuming isotropical interference, i.e., power averaging over all ports in a CSI-RS resource. The measurement can be done over the whole bandwidth (i.e. wideband) and/or in each subband (i.e. over a number of PRBs). For example, assuming the CSI-IM consists of four REs per PRB, then $I_{inter-cell}$ and $I_m$ for the kth wireless device 14 at the ith PRB can be obtained as $$I^k_{inter-cell}(i) = \frac{1}{4}\sum_{l=1}^{4} |y^k_{ZP}(n_l, i)|^2$$

$$I^k_m(i) = \sum_{j=1}^{N_m} |y^k_{NZP,m}(n_j, i)|^2$$

where $y_{ZP}^k(n_l,i)$ is the received signal at the lth RE of the CSI-IM in the ith PRB and $y_{NZP,m}^k(n_j, i)$ is the received signal at the jth RE of mth NZP CSI-RS in the ith PRB, both at the kth UEWD 14. $N_m$ is the number of CSI-RS ports of the mth NZP CSI-RS resource. While four REs are used for each CSI-IM in LTE, the number of REs can be different in NR.

Each wireless device 14 estimates the total interference (i.e., inter-cell plus MU interference) as $I=\sum_{m=1}^{K}(I_m - I_{inter-cell}) + I_{inter-cell}$ and calculates and reports CSI based on I and H according to the configured codebook. That is, wireless device 14 estimates interference $I_m$ on each of the K NZP CSI-RS resources configured for interference measurement, removes the bias inter-cell interference $I_{inter-cell}$ term from each interference estimate $I_m$, and then sums the interference corresponding to the K NZP CSI-RS resources after removing the $I_{inter-cell}$ bias to calculate the total MU-interference (i.e., $\sum_{m=1}^{K}(I_m - I_{inter-cell})$).

Figure 11:
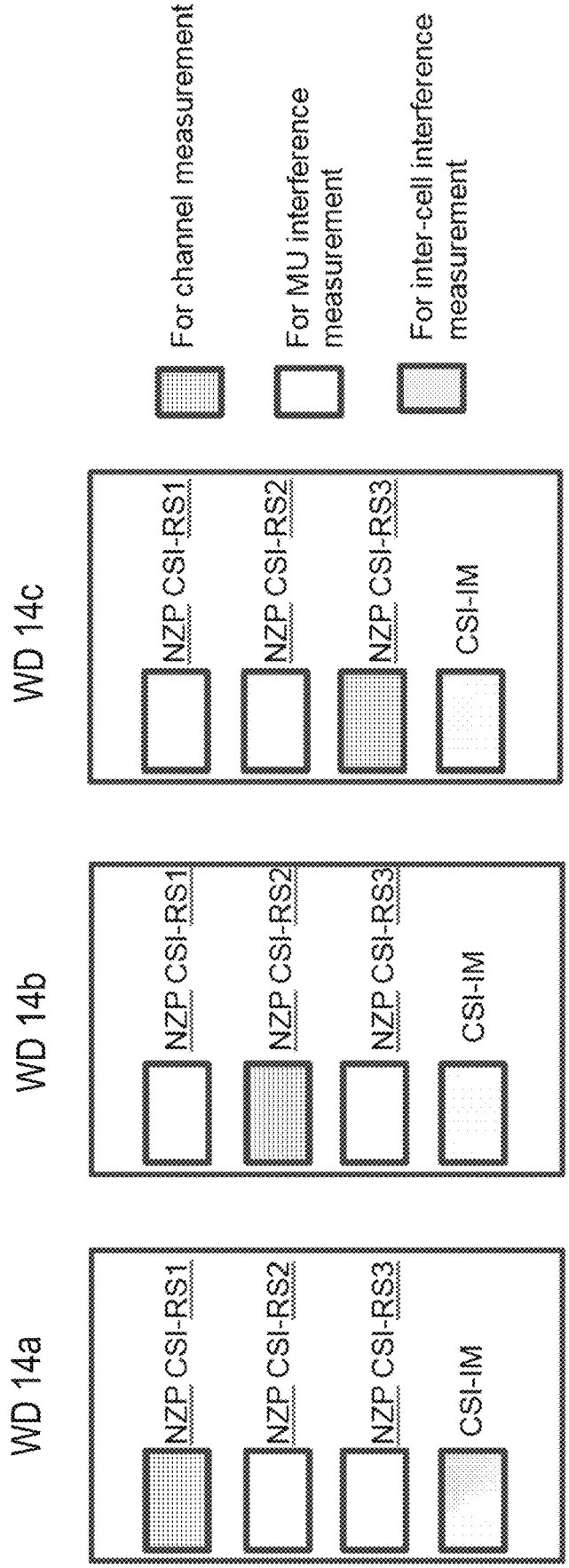
FIG. 11 is a block diagram of three wireless devices that are MU-MIMO candidates and each is configured with three NZP CSI-RS resources and one common CSI-IM resource.

A difference from existing SU-MIMO CSI estimation may be that MU interference is also estimated through the NZP CSI-RS configurations. An example is shown in FIG. 11, where three wireless devices 14a-14c are MU-MIMO candidates and each is configured with three NZP CSI-RS resources and one common CSI-IM resource. For wireless device 14a, network node 12 indicates NZP CSI-RS1 for channel measurement. For wireless device 14b, NZP CSI-RS2 is indicated as for channel measurement and similarly for wireless device 14c, NZP CSI-RS3 is for channel measurement.

Although FIG. 10 illustrates an exemplary process including steps S100-S108, it should be understood that some embodiments may include more or less than the steps shown in FIG. 10 (e.g., only steps S100 and S106).

In an alternative embodiment, instead of including the measured MU-interference from all the K NZP CSI-RS resources, network node 12 may signal to wireless device 14 the interference hypotheses that wireless device 14 should use to measure and report CSI. In one example, network node 12 may ask wireless device 14 to report one SU-MIMO CSI by considering only the inter-cell interference, CSI0, one MU-MIMO CSI considering only the smallest measured MU-interference out of multiple MU interference estimates each measured on one of the K NZP CSI-RS resources, CSI1, and the associated NZP CSI-RS resource index, CRI1. In this case, wireless device 14 would report SU-MIMO CSI0, MU-MIMO CSI1 and CRI1. This can help the network node 12 to decide which wireless device 14 out of the K wireless devices 14 may be the best candidate for wireless device 14 to be paired with.

In another example, network node 12 may ask wireless device 14 to also report an additional MU-MIMO CSI, CSI2, assuming wireless device 14 is paired with another two wireless devices 14. In this case, the smallest sum MU-interference on any two NZP CSI-RS resources out of multiple MU interference estimates is considered and the associated two NZP CSI-RS resource indices, CRI21 and CRI22, are also reported. Thus, the UE would report SU-MIMO CSI0, MU-MIMO {CSI1, CR1}, {CSI2, CRI1, CRI22}. This can help network node 12 to decide which wireless device 14, or two wireless devices 14, out of the K wireless devices 14 may be the best candidate for wireless device 14 to be paired with.

Similarly, the concept can be extended to interference hypotheses for more than two wireless devices 14.

Figure 12:
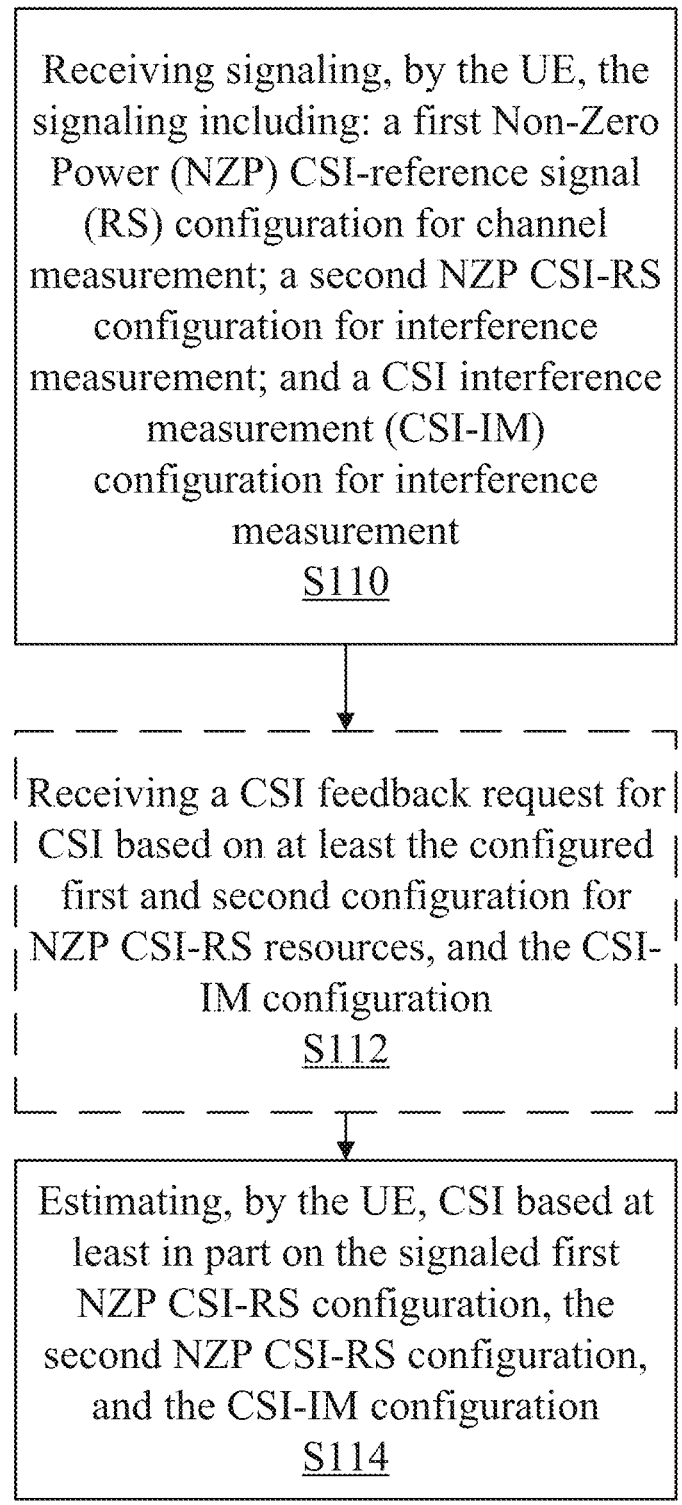
FIG. 12 is a flow diagram of an exemplary estimation process of estimation code in accordance with the principles of the disclosure.

FIG. 12 is a flow diagram of an exemplary estimation process of estimation code 38 of wireless device 14 in accordance with the principles of the disclosure, and, in particular, in accordance with a first exemplary aspect of the disclosure. Processing circuitry 32 is configured to receive signaling, the signaling including: a first Non-Zero Power (NZP) CSI-reference signal (RS) configuration for channel measurement; a second NZP CSI-RS configuration for interference measurements; and a CSI interference measurement (CSI-IM) configuration for interference measurement (Block S110). In some embodiments, the signaling further includes a codebook configuration. In some embodiments, the second NZP CSI-RS configuration is for multiple-user (MU) interference measurement. In some embodiments, the CSI IM configuration is for inter-cell interference measurement. Processing circuitry 32 is optionally configured to receive a CSI feedback request for CSI based on the configured first and second configuration for NZP CSI-RS resources, and the CSI-IM configuration for the CSI-IM resource (Block S112). In some embodiments, the CSI feedback request for CSI is further based on the codebook configuration. Processing circuitry 32 is configured to estimate CSI based at least in part on the signaled first NZP CSI-RS configuration, the second NZP CSI-RS configuration, and the CSI-IM configuration (Block S114). The first and second NZP CSI-RS configurations may be for the NZP CSI-RS resources, which may be K+1 NZP CSI-RS resources. In some embodiments, the processing circuitry 32 is further configured to estimate the CSI based on the codebook configuration.

Although FIG. 11 illustrates an exemplary process including steps S110-S114, it should be understood that some embodiments may include more or less than the steps shown in FIG. 11 (e.g., only steps S110 and S114).

In one or more other embodiments, the configuration process at network node 12 and estimation process at each WD 14 are described below, in accordance with a second exemplary aspect of the disclosure.

At network node 12:
Step 1: obtain SU-MIMO CSI for all WDs 14;
Step 2: determine K+1 WDs 14 as MU-MIMO candidates;
Step 3: configure each candidate with one NZP CSI-RS resource for channel measurement and one CSI-IM resource for interference measurement, including the power ratio parameter β;
Step 4: request a new CSI feedback with a codebook, and transmit a MU-MIMO signal over the CSI-IM resource;
Step 5: receive MU-MIMO CSI from each WD 14;
Step 6: perform MU-MIMO transmission to the K+1 WDs 14 using the new CSIs.

At WD 14:
Step 1: receive configuration with one NZP CSI-RS resource and one CSI-IM resource, including the power ratio parameter β;
Step 2: receive CSI request and the codebook used for CSI feedback;
Step 3: measure the channel on the NZP CSI-RS resource and estimate precoding matrix, and estimate signal power with the estimated precoding matrix and the measured channel;
Step 4: measure interference on the CSI-IM resource and subtract the estimated signal power from the measured interference, resulting in the total estimated interference;
Step 5: calculate CSI based on the measured channel and the total estimated interference according to the configured codebook;
Step 6: feedback the CSI (MU-MIMO CSI) to network node 12.

Figure 13:
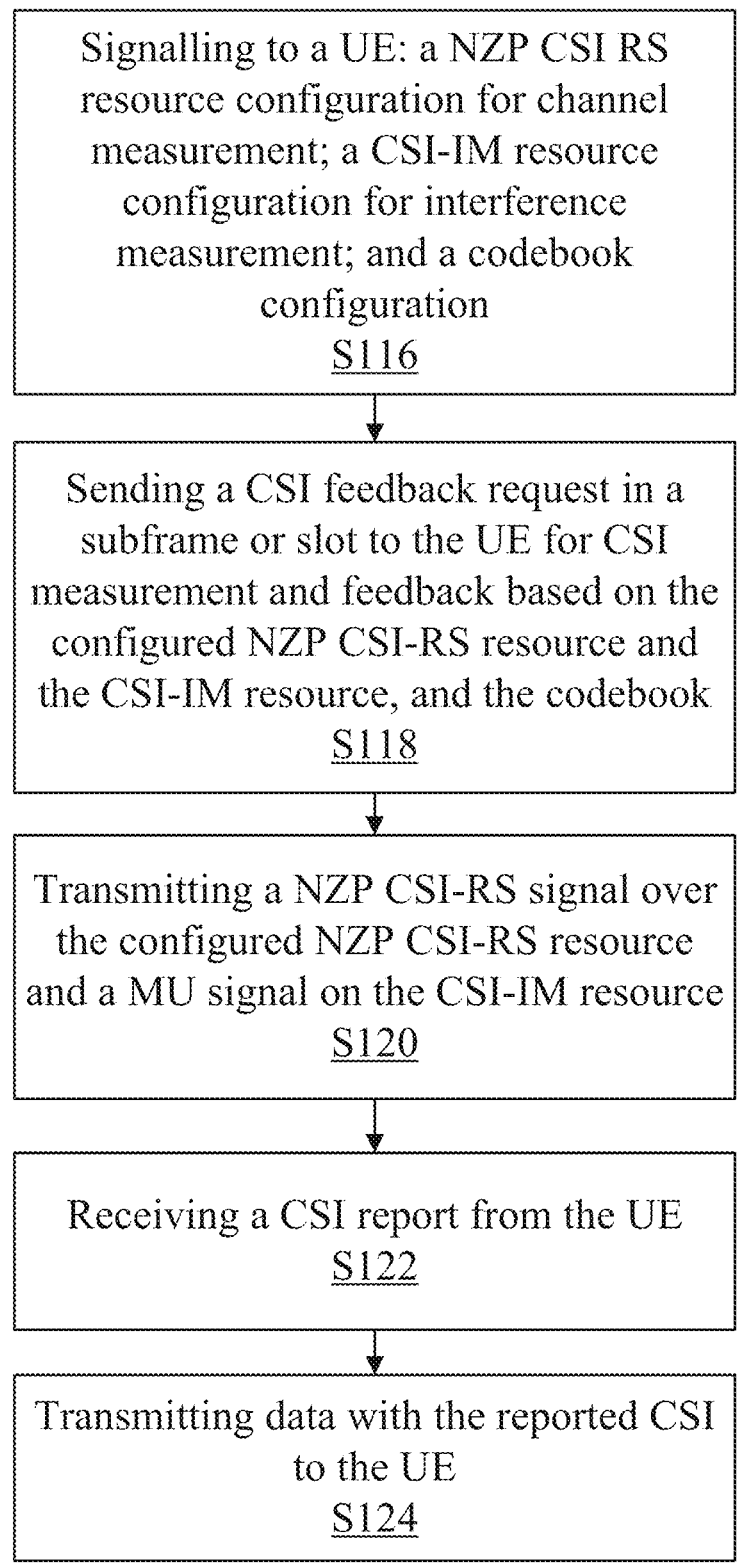
FIG. 13 is a flow diagram of another embodiment of the configuration process of configuration code in accordance with the principles of the disclosure.

FIG. 13 is a flow diagram of another embodiment, i.e., method 2, of the configuration process of configuration code 26 of network node 12 in accordance with the principles of the disclosure, and, in particular, in accordance with the second exemplary aspect of the disclosure. Processing circuitry 20 of network node 12 is configured to signal to a wireless device 14: a NZP CSI RS resource configuration for channel measurement; a CSI-IM resource configuration for interference measurement; a codebook configuration (Block S116), and the power ratio β. Processing circuitry 20 is configured to send a CSI feedback request in a subframe or slot to wireless device 14 for CSI measurement and feedback based on the configured NZP CSI-RS resource and the CSI-IM resource, the codebook (Block S118), and the power ratio β. Processing circuitry 20 is configured to transmit a NZP CSI-RS signal over the configured NZP CSI-RS resource and a MU signal on the CSI-IM resources (Block S120). Processing circuitry 20 is configured receive a CSI report from wireless device 14 (Block S122). In one embodiment, the CSI report being based at least in part on the NZP CSI-RS resource configuration, the CSI-IM resource configuration, the codebook configuration and the power ratio β. Processing circuitry 20 is configured to transmit data with the reported CSI to wireless device 14 (Block S124).

Figure 14:
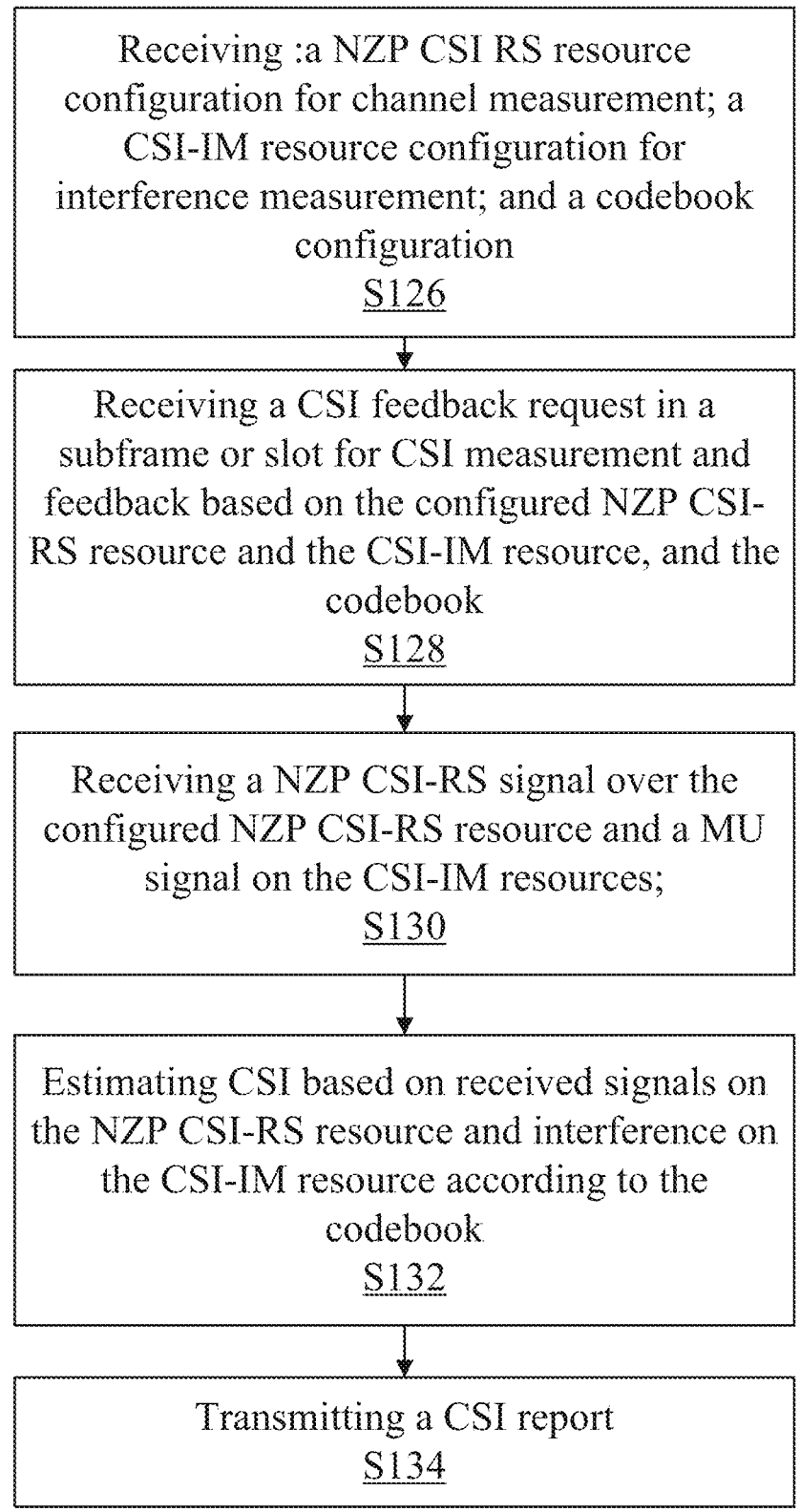
FIG. 14 is a flow diagram of another embodiment of the estimation process of estimation code in accordance with the principles of the disclosure.

FIG. 14 is a flow diagram of another embodiment of the estimation process of estimation code 38 of wireless device 14 in accordance with the principles of the disclosure. Processing circuitry 32 of WD 14 is configured to receive: a NZP CSI RS resource configuration for channel measurement; a CSI-IM resource configuration for interference measurement; a codebook configuration (Block S126), and a power ratio β. Processing circuitry 32 is configured to receive a CSI feedback request in a subframe or slot for CSI measurement and feedback based on the configured NZP CSI-RS resource and the CSI-IM resource, the codebook (Block S128), and the power ratio β. Processing circuitry 32 is configured to receive a NZP CSI-RS signal over the configured NZP CSI-RS resource and a MU signal on the CSI-IM resources (Block S130). Processing circuitry 32 is configured to estimate CSI based on received signals on the NZP CSI-RS resource and interference on the CSI-IM resource according to the codebook (Block S132) and the power ratio β. Processing circuitry 32 is configured to transmitting a CSI report (Block S134). The CSI report may be based on the estimated CSI.

Additional embodiments of a configuration process at network node 12 and estimation process at each wireless device 14 are described below.

In one or more embodiments of the configuration process, i.e., Method 2, similar to Method 1, it is assumed that network node 12 first obtains SU-MIMO CSI (i.e. CRI, RI, PMI, CQI) from serving wireless devices 14 as is normally done in LTE or NR. Network node 12 then determines K+1 (K>0) wireless device 14 candidates for MU-MIMO based on the SU-MIMO CSI. In this method, to obtain MU-MIMO CQI by taking into MU interference, network node 12 configures each of the K+1 wireless device 14 candidates with one NZP CSI-RS resource for channel measurement and one ZP CSI-RS as CSI-IM. The CSI-IM resource is common to the K+1 wireless devices 14 in the same subframe or slot and request CSI report from each wireless device 14.

Network node 12 transmits a MU-MIMO signal including all the K+1 wireless devices 14 in the configured ZP CSI-RS resource, i.e. sending the following signals $$\Sigma_{m=1}^{K+1} W^m(i) s^m(i)$$

where $W^k(i)$, $s^k(i)$ are the precoding matrix and the data vector associated with the kth UE at the $i^{th}$ RE of CSI-IM resource.

Each wireless device 14 measures interference, $I_{ZP}$, over the CSI-IM resource and estimate a precoded signal power over the NZP CSI-RS resource, i.e. $p_s = \beta \|HW\|^2$, where H is the estimated channel matrix and W is the estimated precoding matrix from the NZP CSI-RS resource. Each wireless device 14 calculates and report CSI based on $I = I_{ZP} - p_s$ and H according to the configured codebook. Here, the bias $p_s$ is due to the fact that a precoded signal intended for each wireless device 14 is transmitted in the CSI-IM resource for other wireless devices 14 in a MU-MIMO group to measure its interference. Thus, in one or more embodiments, it is removed from the measurement $I_{ZP}$ made on the CSI-IM resource to obtain an estimate of the total interference from other wireless devices 14.

Figure 15:
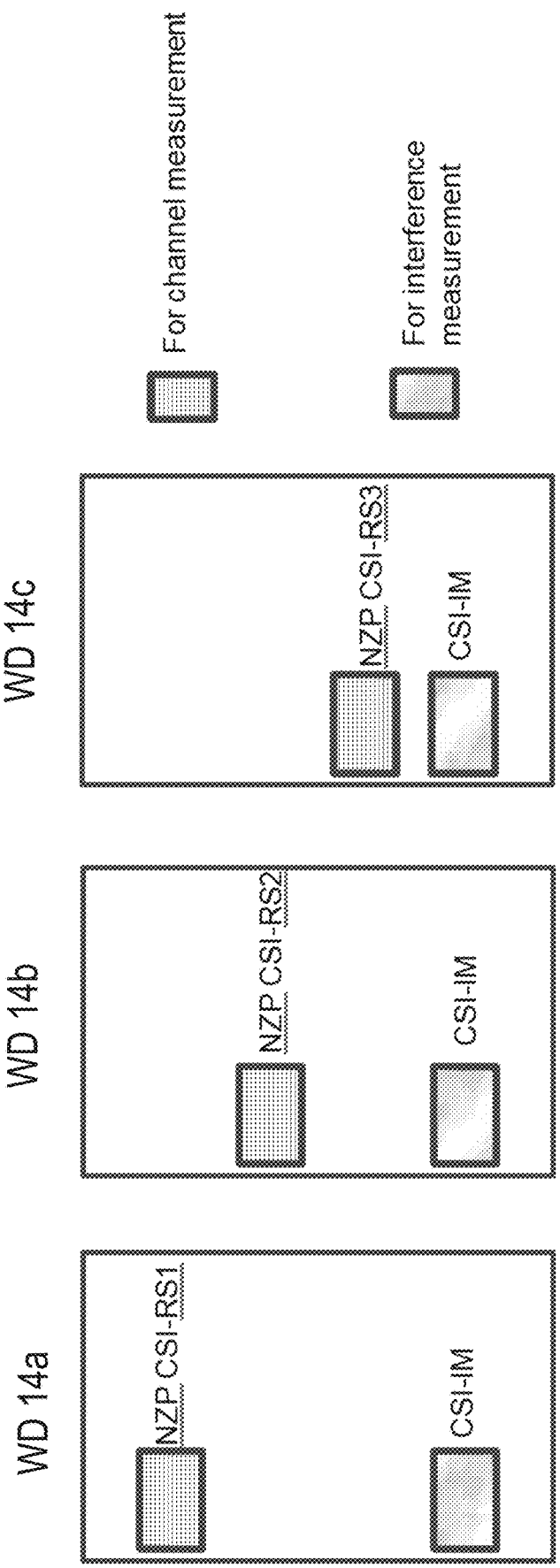
FIG. 15 is a block diagram of method two in accordance with the principles of the disclosure.

An example is shown in FIG. 15, where three wireless devices 14a-14c are MU-MIMO candidates and each is configured with one NZP CSI-RS resource, i.e., NZP CSI-RS1 for wireless device 14a, NZP CSI-RS 2 for wireless device 14b, and NZP CSI-RS 3 for wireless device 14c. One common CSI-IM resource is also configured for all three wireless devices 14.

Figure 16:
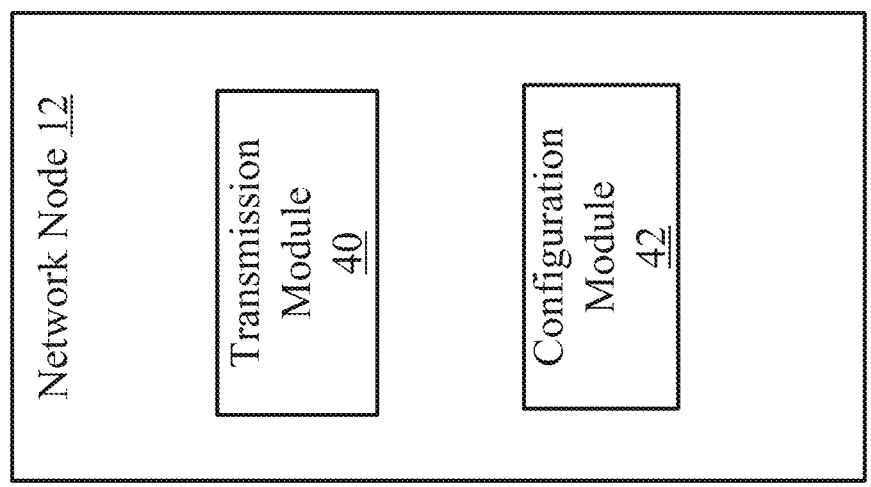
FIG. 16 is an alternative embodiment of network node in accordance with the principles of the disclosure.

FIG. 16 is an alternative embodiment of network node 12 in accordance with the principles of the disclosure. In this embodiment, network node 12 includes transmission module 40 for performing transmitting, sending and/or signaling as described above. Network node 12 includes configuration module 42 for performing the functions and/or processes as described above with respect to configuration code 26.

Figure 17:
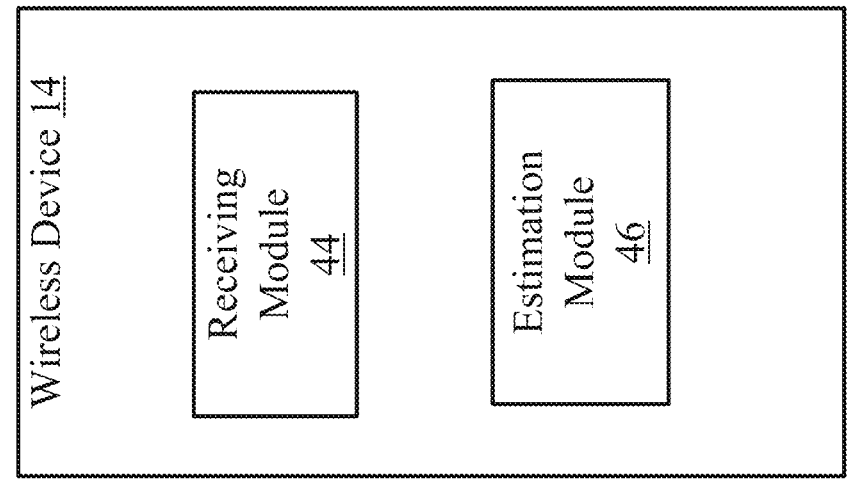
FIG. 17 is an alternative embodiment of wireless device in accordance with the principals of the disclosure.

FIG. 17 is an alternative embodiment of wireless device 14 in accordance with the principals of the disclosure. In this embodiment, wireless device 14 includes receiving module 44 for receiving transmissions, communications and/or signaling from network node 12 as described above. Wireless device 14 includes estimation module 46 for performing the processes and/or functions describe above with respect to estimation code 38.

According to one aspect of the disclosure, a method for a UE 14 is provided. The method includes receiving (S110) signaling, by the UE 14, the signaling including: a first Non-Zero Power (NZP) channel state information-reference signal (CSI-RS) configuration for channel measurement; a second NZP CSI-RS configuration for interference measurement; and a CSI interference measurement (CSI-IM) configuration for interference measurement; and estimating (S114), by the UE 14, CSI based at least in part on the signaled first NZP CSI-RS configuration, the second NZP CSI-RS configuration, and the CSI-IM configuration.

According to this aspect, in some embodiments, second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the receiving (S110) signaling further includes receiving the signaling including a codebook configuration. In some embodiments, the estimating (S114) the CSI further comprises estimating the CSI based on the codebook configuration. In some embodiments, the method further comprises receiving (S112), by the UE 14, a CSI feedback request for CSI based on at least the first NZP CSI-RS configuration, the second NZP CSI-RS configuration, the CSI-IM configuration and the codebook configuration. In some embodiments, the method further comprises receiving (S112), by the UE 14, a CSI feedback request for CSI based on at least the first NZP CSI-RS configuration, the second NZP CSI-RS configuration, and the CSI-IM configuration. In some embodiments, the estimating (S114) the CSI further includes measuring a downlink channel on a first NZP CSI-RS resource corresponding to the first NZP CSI-RS configuration. In some embodiments, the estimating (S114) the CSI further includes measuring interference on each of K NZP CSI-RS resources corresponding to the second NZP CSI-RS configuration. In some embodiments, the measuring the interference on each of the K NZP CSI-RS resources results in K interference power estimates. In some embodiments, each of the K interference power estimates is scaled according to a power scaling factor associated with the K NZP CSI-RS resources. In some embodiments, the second NZP CSI-RS configuration comprises a power scaling factor for each of K NZP CSI-RS resources configured by the second NZP CSI-RS configuration for the interference measurement. In some embodiments, the estimating (S114) the CSI includes measuring interference on at least one CSI-IM resource corresponding to the CSI-IM configuration. In some embodiments, the measuring the interference on the at least one CSI-IM resource results in at least one interference power estimate. In some embodiments, the method further comprises adding at least the K interference power estimates based on the K NZP CSI-RS resources and the at least one interference power estimate based on the at least one CSI-IM resource to obtain a combined interference estimate. In some embodiments, the estimated CSI is based on the combined interference estimate and a measured downlink channel. In some embodiments, the measured downlink channel is measured on a first NZP CSI-RS resource corresponding to the first NZP CSI-RS configuration. In some embodiments, the method further comprises receiving, by the UE 14, a CSI feedback request comprising a codebook configuration.

According to another aspect of the disclosure, a UE 14 comprising processing circuitry 32 is provided. The processing circuitry 32 is configured to cause the UE 14 to: receive signaling, the signaling including: a first Non-Zero Power (NZP) channel state information (CSI)-reference signal (RS) configuration for channel measurement; a second NZP CSI-RS configuration for interference measurement; and a CSI interference measurement (CSI-IM) configuration for interference measurement; and estimate CSI based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>=1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the received signaling further includes a codebook configuration. In some embodiments, the processing circuitry 32 is configured to cause the UE 14 to estimate the CSI by being further configured to estimate the CSI based on the codebook configuration. In some embodiments, the processing circuitry 32 is further configured to cause the UE 14 to receive a CSI feedback request for CSI based on at least the first NZP CSI-RS configuration, the second NZP CSI-RS configuration, the CSI-IM configuration and the codebook configuration. In some embodiments, the processing circuitry 32 is further configured to cause the UE 14 to receive a CSI feedback request for CSI based on at least the first NZP CSI-RS configuration, the second NZP CSI-RS configuration, and the CSI-IM configuration. In some embodiments, the processing circuitry 32 is configured to cause the UE 14 to estimate the CSI by being further configured to measure a downlink channel on a first NZP CSI-RS resource corresponding to the first NZP CSI-RS configuration. In some embodiments, the processing circuitry 32 is configured to cause the UE 14 to estimate the CSI by being further configured to measure interference on each of K NZP CSI-RS resources corresponding to the second NZP CSI-RS configuration. In some embodiments, the processing circuitry 32 is configured to measure the interference on each of the K NZP CSI-RS resources resulting in K interference power estimates. In some embodiments, the processing circuitry 32 is configured to scale each of the K interference power estimates according to a power scaling factor associated with the K NZP CSI-RS resources. In some embodiments, the second NZP CSI-RS configuration comprises a power scaling factor for each of K NZP CSI-RS resources configured by the second NZP CSI-RS configuration for the interference measurement. In some embodiments, the processing circuitry 32 is configured to cause the UE 14 to estimate the CSI by being further configured to measure interference on at least one CSI-IM resource corresponding to the CSI-IM configuration. In some embodiments, the processing circuitry 32 is configured to measure the interference on the at least one CSI-IM resource resulting in at least one interference power estimate. In some embodiments, the processing circuitry 32 is configured to cause the UE 14 to add at least the K interference power estimates based on the K NZP CSI-RS resources and the at least one interference power estimate based on the at least one CSI-IM resource to obtain a combined interference estimate. In some embodiments, the processing circuitry 32 is configured to cause the UE 14 to estimate the CSI based on the combined interference estimate and a measured downlink channel. In some embodiments, the measured downlink channel is measured on a first NZP CSI-RS resource corresponding to the first NZP CSI-RS configuration. In some embodiments, the processing circuitry 32 is further configured to cause the UE 14 to receive a CSI feedback request comprising a codebook configuration.

According to yet another aspect of the disclosure, a method for a base station 12 is provided. The method includes signaling (S100), by the base station 12, to a user equipment, UE 14: a first Non-Zero Power (NZP) channel state information (CSI)-reference signal (RS) configuration for channel measurement; a second NZP CSI-RS configuration for interference measurement; and a CSI interference measurement (CSI-IM) configuration for interference measurement; and receiving (S106), by the base station 12, a CSI report from the UE 14, the CSI report being based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments, the second NZP CSI-RS configuration is for multiple-user (MU) interference measurement. In some embodiments, the CSI-IM configuration is for inter-cell interference measurement. In some embodiments, the signaling (S100) further includes signaling a codebook configuration. In some embodiments, the received CSI report is based at least in part on the signaled codebook configuration. In some embodiments, the method further includes sending (S102), from the base station 12, a CSI feedback request to the UE 14 for CSI based on at least the first NZP CSI-RS configuration, the second NZP CSI-RS configuration, the CSI-IM configuration, and the codebook configuration. In some embodiments, the method further includes sending (S102), from the base station 12, a CSI feedback request to the UE 14 for CSI based on at least the first NZP CSI-RS configuration, the second NZP CSI-RS configuration and the CSI-IM configuration. In some embodiments, the method further includes transmitting (S104), from the base station 12, K+1 NZP CSI-reference signals (RSs) over K+1 NZP CSI-RS resources configured by the signaling of the first NZP CSI-RS configuration and the second NZP CSI-RS configuration. In some embodiments, the signaling, by the base station 12, to the UE 14 includes signaling semi-statically over radio resource control signaling. In some embodiments, the sending, from the base station 12, the CSI feedback request to the UE 14 includes sending the CSI feedback request dynamically over a downlink control channel. In some embodiments, the second NZP CSI-RS configuration comprises a power scaling factor for each of K NZP CSI-RS resources configured by the second NZP CSI-RS configuration for the interference measurement. In some embodiments, the received CSI report is based on a combined interference estimate and a measured downlink channel, the combined interference estimate being a sum of at least K interference power estimates based on K NZP CSI-RS resources configured by the second NZP CSI-RS configuration and at least one interference power estimate based on at least one CSI-IM resource configured by the CSI-IM configuration, and the measured downlink channel being based on a first NZP CSI-RS resource corresponding to the first NZP CSI-RS configuration. In some embodiments, the method further includes sending, from the base station 12, a CSI feedback request comprising a codebook configuration.

According to yet another aspect of the disclosure, a base station 12 comprising processing circuitry 20 is provided. The processing circuitry 20 is configured to cause the base station 12 to: signal to a UE 14: a first Non-Zero Power (NZP) channel state information (CSI)-reference signal (RS) configuration for channel measurement; a second NZP CSI-RS configuration for interference measurement; and a CSI interference measurement (CSI-IM) configuration for interference measurement; and receive a CSI report from the UE 14, the CSI report being based at least in part on the signaled first NZP CSI-RS configuration, the second NZP CSI-RS configuration, and the CSI-IM configuration.

According to this aspect, in some embodiments, the second NZP CSI-RS configuration is for configuring K NZP CSI-RS resources for the interference measurement, where K>1. In some embodiments, the interference measurement measured on the K NZP CSI-RS resources corresponds to multiple-user multiple-input multiple-output (MU-MIMO) interference. In some embodiments, K+1 corresponds to a number of user equipment candidates for multiple-user multiple-input multiple-output (MU-MIMO) communication. In some embodiments) the second NZP CSI-RS configuration is for multiple-user (MU) interference measurement. In some embodiments, the CSI-IM configuration is for inter-cell interference measurement. In some embodiments, the processing circuitry 20 is configured to signal to the UE 14 by being further configured to signal a codebook configuration. In some embodiments, the received CSI report is based at least in part on the signaled codebook configuration. In some embodiments, the processing circuitry 20 is further configured to send (S102) a CSI feedback request to the UE 14 for CSI based on at least the first NZP CSI-RS configuration, the second NZP CSI-RS configuration, the CSI-IM configuration, and the codebook configuration. In some embodiments, the processing circuitry 20 is further configured to send a CSI feedback request to the UE 14 for CSI based on at least the first NZP CSI-RS configuration, the second NZP CSI-RS configuration and the CSI-IM configuration. In some embodiments, the processing circuitry 20 is further configured to transmit K+1 NZP CSI-reference signals (RSs) over K+1 NZP CSI-RS resources configured by the signaling of the first NZP CSI-RS configuration and the second NZP CSI-RS configuration. In some embodiments, the processing circuitry 20 is configured to signal to the UE 14 by being further configured to signal semi-statically over radio resource control signaling. In some embodiments, the processing circuitry 20 is configured to send the CSI feedback request to the UE 14 by being further configured to send the CSI feedback request dynamically over a downlink control channel. In some embodiments, the processing circuitry 20 is configured to signal to the UE 14 by being further configured to signal the second NZP CSI-RS configuration comprising a power scaling factor for each of K NZP CSI-RS resources configured by the second NZP CSI-RS configuration for the interference measurement. In some embodiments, the received CSI report is based on a combined interference estimate and a measured downlink channel, the combined interference estimate being a sum of at least K interference power estimates based on K NZP CSI-RS resources configured by the second NZP CSI-RS configuration and at least one interference power estimate based on at least one CSI-IM resource configured by the CSI-IM configuration, and the measured downlink channel being based on a first NZP CSI-RS resource corresponding to the first NZP CSI-RS configuration. In some embodiments, the processing circuitry 20 is further configured to send a CSI feedback request comprising a codebook configuration.

Some embodiments of the disclosure include:

Embodiment 1. A method of channel state information feedback in a wireless network consisting of access nodes equipped with multiple transmit antenna ports transmitting data to user equipments. The method comprises Signaling, by a access node, to a UE a first NZP CSI-RS configuration for channel measurement, and a second configuration for K>=1 NZP CSI-RS for MU interference measurements, and a CSI-IM resource configuration for inter-cell interference measurement, and a codebook configuration; and Sending, by the access node, a CSI feedback request to the UE for CSI measurement and feedback based on the configured the first and the second configuration for NZP CSI-RS resources, the CSI-IM resource, and the codebook; and Transmitting, from the access node, K+1 NZP CSI-RS over the configured K+1 NZP CSI-RS resources; and Estimating, by the UE, CSI based on the signaled first and the second configuration of NZP CSI-RS resources, the CSI-IM resource, and the codebook; and Receiving, by the access node, a CSI report from the UE; and Transmitting, from the access node, data with the reported CSI to the UE.

Embodiment 2. The method according to Embodiment 1, wherein the estimating comprises measuring downlink channel on the first NZP CSI-RS resource.

Embodiment 3. The method according to Embodiment 1, wherein the estimating further comprises measuring interference power on each of the K NZP CSI-RS resources, resulting in K interference power estimates.

Embodiment 4. The method according to Embodiment 1, wherein the estimating further comprises measuring an inter-cell interference power on the CSI-IM resource;

Embodiment 5. The method according to Embodiment 3 and Embodiment 4, wherein the measured inter-cell interference power is subtracted from each of the K interference power estimates, resulting in K MU interference power estimates.

Embodiment 6. The methods of Embodiment 3 to Embodiment 5, wherein the K MU interference power estimates and the inter-cell interference estimate are added up, resulting in a total interference estimate.

Embodiment 7. The methods of Embodiment 1 to Embodiment 6, wherein the CSI estimation is based on the total interference estimate and the measured downlink channel.

Embodiment 7a. The method according to Embodiment 1, wherein the CSI feedback request can further contain multiple interference hypotheses.

Embodiment 7b. The method according to Embodiment 7a, wherein the interference hypothesis can include assumption of a number of interfering wireless devices or a maximum number of interfering wireless devices, each is associated with one of the K NZP CSI-RS.

Embodiment 7c. The method according to Embodiment 1, wherein the CSI can further contain a SU-MIMO CSI and one or more MU CSI.

Embodiment 7d. The method of Embodiment 7c, where the SU-MIMO CSI corresponds to CSI without any MU interference.

Embodiment 7e. The method of Embodiment 7c, where the MU-MIMO CSI corresponds to CSI with smallest sum MU interference estimated over a number of NZP CSI-RS resources out of the K NZP CSI-RS resources;

Embodiment 7f. The method of Embodiment 7e, where the number of NZP CSI-RS resources is specified in the interference hypothesis.

Embodiment 8. The method according to Embodiment 1, wherein the signaling is semi-static over radio resource control signaling.

Embodiment 9. The method according to Embodiment 1, wherein the signaling is dynamic over downlink control channel.

Embodiment 10. The method according to Embodiment 1, wherein the sending is dynamic over downlink control channel.

Embodiment 11. The method according to Embodiment 1, wherein the signaling and the sending are in a same downlink control information over downlink control channel.

Embodiment 11a. The method according to any one of Embodiments 1 to 11, wherein the first and the second NZP CSI-RS configurations further include a power ratio parameter for each NZP CSI-RS.

Embodiment 12. A method of channel state information feedback in a wireless network consisting of access nodes equipped with multiple transmit antenna ports transmitting data to wireless devices, the method comprising:

Signaling, by an access node, to a wireless device, a NZP CSI-RS resource configuration for channel measurement, and a CSI-IM resource configuration for interference measurement, and a codebook configuration; and Sending, by the access node, a multi-user (MU) CSI feedback request in a subframe or slot to the wireless device for CSI measurement and feedback based on the configured NZP CSI-RS resource and the CSI-IM resource, and the codebook; and Transmitting, from the access node, a NZP CSI-RS signal over the configured NZP CSI-RS resource and a MU signal on the CSI-IM resource; and estimating, by the UE, a MU CSI based on received signals on the NZP CSI-RS resource and interference on the CSI-IM resource according to the codebook; and Receiving, by the access node, a MU CSI report from the wireless device; and Transmitting, from the access node, data with the reported CSI to the UE.

Embodiment 13a. The method according to Embodiment 12, wherein the NZP CSI-RS resource configuration for channel measurement further includes a power ratio parameter for each NZP CSI-RS.

Embodiment 13b. The method according to Embodiment 12, wherein the estimating comprises measuring downlink channel on the NZP CSI-RS resource.

Embodiment 14. The method according to any one of Embodiments 13b and 13a, wherein the measuring further comprises measuring a precoding matrix and a signal power by multiply the precoding matrix to the estimated channel and the power ratio.

Embodiment 15. The method according to Embodiment 12, wherein the estimating further comprises measuring interference power on the CSI-IM resource.

Embodiment 16. The method according to Embodiment 14 and Embodiment 15, wherein the measured signal power is subtracted from the measured interference power, resulting in a new estimate of interference power.

Embodiment 17. The method of Embodiment 12 to Embodiment 16, wherein the CSI estimation is based the new estimate of interference power and the measured downlink channel.

Embodiment 18. The method according to Embodiment 1, wherein the signaling is semi-static over radio resource control signaling.

Embodiment 19. The method according to Embodiment 1, wherein the signaling is dynamic over downlink control channel.

Embodiment 20. The method according to Embodiment 1, wherein the sending is dynamic over downlink control channel.

Embodiment 21a. The method according to Embodiment 1, wherein the signaling and the sending are in a same downlink control information over downlink control channel.

Embodiment 21b. The method according to any one of Embodiments 1 to 21a, wherein the NZP CSI-RS resource configuration for channel measurement includes a power ratio parameter.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a user equipment, UE, the method comprising:
    receiving signaling, by the UE, the signaling including:
        a first Non-Zero Power, NZP, channel state information, CSI,-reference signal, RS, configuration for channel measurement;
        a second NZP CSI-RS configuration for interference measurement;
        a CSI interference measurement, CSI-IM, configuration for interference measurement; and
        a codebook configuration;
    receiving a CSI feedback request associated with the signaled first NZP CSI-RS configuration, the second NZP CSI-RS configuration, and the CSI-IM configuration;
    measuring a downlink channel on a single first NZP CSI-RS resource corresponding to the first NZP CSI-RS configuration; and
    transmitting a CSI report based on the signaled first NZP CSI-RS configuration, the second NZP CSI-RS configuration and the CSI-IM configuration.

2. The method according to claim 1, wherein the second NZP CSI-RS configuration is for K NZP CSI-RS resources for the interference measurement, where $K>=1$.

3. The method according to claim 2, further comprising measuring interference on each of the K NZP CSI-RS resources corresponding to the second NZP CSI-RS configuration.

4. The method according to claim 3, wherein the measuring the interference on each of the K NZP CSI-RS resources results in K interference power estimates.

5. The method according to claim 1, further comprising measuring interference on at least one CSI-IM resource corresponding to the CSI-IM configuration.

6. The method according to claim 4, further comprising accounting for at least the K interference power estimates based on the K NZP CSI-RS resources and at least one interference measurement based on at least one CSI-IM resource to obtain a combined interference estimate.

7. The method according to claim 6, wherein an estimated CSI is based on the combined interference estimate and the measured downlink channel.

8. A user equipment, UE, comprising processing circuitry configured to cause the UE to:
    receive signaling, the signaling including:
        a first Non-Zero Power, NZP, channel state information, CSI,-reference signal, RS, configuration for channel measurement;
        a second NZP CSI-RS configuration for interference measurement;
        a CSI interference measurement, CSI-IM, configuration for interference measurement; and
        a codebook configuration;
    receive a CSI feedback request associated with the signaled first NZP CSI-RS configuration, the second NZP CSI-RS configuration, and the CSI-IM configuration;
    measure a downlink channel on a single first NZP CSI-RS resource corresponding to the first NZP CSI-RS configuration; and
    transmit a CSI report based on the signaled first NZP CSI-RS configuration, the second NZP CSI-RS configuration and the CSI-IM configuration.

9. The UE according to claim 8, wherein the second NZP CSI-RS configuration is for K NZP CSI-RS resources for the interference measurement, where $K>=1$.

10. The UE according to claim 8, wherein the processing circuitry is configured to cause the UE to measure interference on each of the K NZP CSI-RS resources corresponding to the second NZP CSI-RS configuration.

11. The UE according to claim 10, wherein the processing circuitry is configured to measure the interference on each of the K NZP CSI-RS resources resulting in K interference power estimates.

12. The UE according to claim 8, wherein the processing circuitry is configured to cause the UE to measure interference on at least one CSI-IM resource corresponding to the CSI-IM configuration.

13. The UE according to claim 11, wherein the processing circuitry is configured to cause the UE to account for at least the K interference power estimates based on the K NZP CSI-RS resources and at least one interference measurement based on at least one CSI-IM resource to obtain a combined interference estimate.

14. The UE according to claim 13, wherein the processing circuitry is configured to cause the UE to estimate CSI based on the combined interference estimate and the measured downlink channel.

15. A base station comprising processing circuitry, the processing circuitry configured to cause the base station to:
signal to a user equipment, UE:
a first Non-Zero Power, NZP, channel state information, CSI,-reference signal, RS, configuration for channel measurement;
a second NZP CSI-RS configuration for interference measurement;
a CSI interference measurement, CSI-IM, configuration for interference measurement; and
a codebook configuration;
send a CSI feedback request associated with the signaled first NZP CSI-RS configuration, the second NZP CSI-RS configuration, and the CSI-IM configuration;
receive a CSI report from the UE, the CSI report being based at least in part on:
a downlink channel measurement on a single first NZP CSI-RS resource corresponding to the signaled first NZP CSI-RS configuration;
the second NZP CSI-RS configuration; and
the CSI-IM configuration.

16. The base station according to claim 15, wherein the second NZP CSI-RS configuration is for K NZP CSI-RS resources for the interference measurement, where K>=1.

17. The base station according to claim 16, wherein the processing circuitry is further configured to transmit K+1 NZP CSI-reference signals, RSs, over K+1 NZP CSI-RS resources configured by the signaling of the first NZP CSI-RS configuration and the second NZP CSI-RS configuration.

18. The base station according to claim 16, wherein the received CSI report is based on a combined interference estimate and the measured downlink channel, the combined interference estimate accounting for at least K interference power estimates based on the K NZP CSI-RS resources configured by the second NZP CSI-RS configuration and at least one interference measurement based on at least one CSI-IM resource configured by the CSI-IM configuration.

19. The method according to claim 2, wherein K+1 corresponds to a number of UE candidates for Multi-user Multiple-input Multiple-output, MU-MIMO, all UE candidates being within a single cell.

20. The UE according to claim 9, wherein K+1 corresponds to a number of UE candidates for Multi-user Multiple-input Multiple-output, MU-MIMO, all UE candidates being within a single cell.

21. The base station according to claim 16, wherein K+1 corresponds to a number of UE candidates for Multi-user Multiple-input Multiple-output, MU-MIMO, all UE candidates being within a single cell.

* * * * *